(12) United States Patent
Ramachandra et al.

(10) Patent No.: US 10,536,862 B2
(45) Date of Patent: Jan. 14, 2020

(54) WIRELESS DEVICE, RADIO NETWORK NODE AND METHODS PERFORMED THEREIN

(71) Applicant: Telefonaktiebolaget LM Ericsson (publ), Stockholm (SE)

(72) Inventors: Pradeepa Ramachandra, Linköping (SE); Icaro Leonardo J. Da Silva, Solna (SE); Reza Moosavi, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/568,890

(22) PCT Filed: Sep. 28, 2017

(86) PCT No.: PCT/SE2017/050946
§ 371 (c)(1),
(2) Date: Oct. 24, 2017

(87) PCT Pub. No.: WO2018/063070
PCT Pub. Date: Apr. 5, 2018

(65) Prior Publication Data
US 2018/0302803 A1 Oct. 18, 2018

Related U.S. Application Data

(60) Provisional application No. 62/401,970, filed on Sep. 30, 2016.

(51) Int. Cl.
*H04W 4/00* (2018.01)
*H04W 24/02* (2009.01)
(Continued)

(52) U.S. Cl.
CPC ......... *H04W 24/02* (2013.01); *H04W 56/001* (2013.01); *H04W 76/27* (2018.02); *H04W 24/08* (2013.01)

(58) Field of Classification Search
CPC ................. H04W 24/02; H04W 36/0094; H04W 56/001
See application file for complete search history.

(56) References Cited

U.S. PATENT DOCUMENTS

| | | | |
|---|---|---|---|
| 2011/0305180 A1* | 12/2011 | Osterling | H04W 74/006 370/311 |
| 2013/0107826 A1* | 5/2013 | Dinan | H04W 16/32 370/329 |

(Continued)

OTHER PUBLICATIONS

NPL-2 3GPP TSG-RAM WG1 Meeting #86; Gothenburg, Sweden, May 22-28, 2016; R1-167055 Source: Ericsson: Title: Connected mode (Year: 2016).*

(Continued)

*Primary Examiner* — Chi H Pham
*Assistant Examiner* — Fahmida S Chowdhury
(74) *Attorney, Agent, or Firm* — Withrow & Terranova, PLLC

(57) ABSTRACT

Embodiments herein relate to a radio network node for handling signaling in a wireless communication network. The radio network node is configured to transmit synchronization signals with a first periodicity for wireless devices in a service area of the radio network node. The radio network node is further configured to detect one or more wireless devices being in a connected mode and incoming from a handover, or moving to the connected mode within the service area or within a neighborhood of the radio network node; and to trigger in response to detecting the one or more wireless devices, a transmission of additional reference signals for performing measurements on.

15 Claims, 18 Drawing Sheets

(51) Int. Cl.
*H04W 76/27* (2018.01)
*H04W 56/00* (2009.01)
*H04W 24/08* (2009.01)

(56) References Cited

U.S. PATENT DOCUMENTS

| | | | | |
|---|---|---|---|---|
| 2013/0201940 | A1* | 8/2013 | Zhang | H04W 52/12 370/329 |
| 2013/0242730 | A1* | 9/2013 | Pelletier | H04W 28/0284 370/230 |
| 2013/0281076 | A1* | 10/2013 | Dannnjanovic | H04W 8/22 455/418 |
| 2014/0036812 | A1* | 2/2014 | Malladi | H04W 72/042 370/329 |
| 2014/0211677 | A1* | 7/2014 | Barbieri | G01S 5/00 370/311 |
| 2015/0078465 | A1* | 3/2015 | Yi | H04L 5/001 375/260 |
| 2015/0230259 | A1* | 8/2015 | Park | H04B 7/0626 370/329 |
| 2017/0111888 | A1* | 4/2017 | Dinan | H04W 72/042 |
| 2018/0235013 | A1* | 8/2018 | Jung | H04W 74/0833 |

OTHER PUBLICATIONS

NPL-1: TSG-RAN WG1 Meeting #86: Gothenburg, Sweden. Aug. 22-26, 2016; R1-167055 Source: Ericsson Title: Overview of initial access and mobility (Year: 2016). (Year: 2016)*

Ericsson, "R1-167055: Overview of initial access and mobility," 3rd Generation Partnership Project (3GPP), TSG-RAN WG1 Meeting #86, Aug. 22-26, 2016, 3 pages, Gothenburg, Sweden.

Ericsson, "R1-167057: Connected mode mobility," 3rd Generation Partnership Project (3GPP), TSG-RAN WG1 Meeting #86, May 22-26, 3 pages, Gothenburg, Sweden.

International Search Report and Written Opinion for International Patent Application No. PCT/SE2017/050946, dated Dec. 6, 2017, 18 pages.

NTT DOCOMO, "RP-160671: New SID Proposal: Study on New Radio Access Technology," 3rd Generation Partnership Project, TSG RAN Meeting #71, Mar. 7-10, 2016, 8 pages, Goteborg, Sweden.

International Preliminary Report on Patentability for International Patent Application No. PCT/SE2017/050946, dated Mar. 30, 2019, 17 pages.

* cited by examiner

WIRELESS DEVICE, RADIO NETWORK NODE AND METHODS PERFORMED THEREIN

This application is a 35 U.S.C. § 371 national phase filing of International Application No. PCT/SE2017/050946, filed Sep. 28, 2017, which claims the benefit of U.S. Provisional Application No. 62/401,970, filed Sep. 30, 2016, the disclosures of which are incorporated herein by reference in their entireties.

TECHNICAL FIELD

Embodiments herein relate to a wireless device, a radio network node and methods performed therein regarding wireless communication. In particular, embodiments herein relate to signaling in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cells, with each service area or cell being served by a radio network node e.g., a Wi-Fi access point or a radio base station (RBS), which in some networks may also be called, for example, a "NodeB" or "eNodeB". The service area or cell is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for communication with user equipments. In a forum known as the Third Generation Partnership Project (3GPP), telecommunications suppliers propose and agree upon standards for present and future networks e.g. UTRAN, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the $3^{rd}$ Generation Partnership Project (3GPP) and this work continues in the coming 3GPP releases for e.g. $4^{th}$ and $5^{th}$ generation networks. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

The 3GPP is currently working on standardization of the 5th generation (5G) of radio access system, also called New Radio (NR) network. An evolved architecture for the RAN is foreseen, both for the LTE Evolution and the New Radio tracks of 5G. This includes a solution where the radio network nodes such as radio base stations may be split into parts for radio network control, packet processing and radio nodes (RN) with base-band processing and radio units. An example of the new architecture is shown in FIG. 1, indicating possible interfaces and also Radio Control Nodes (RCN) and Packet Processing Node (PPN). The NR network needs to be connected to some core network that provides non-access stratum (NAS) functions and connection to communication networks outside NR, like the internet. This is here shown as a core network as specified by 3GPP.

Existing solutions rely on frequent broadcast of cell identities and other radio area identities from all radio nodes all the time. These identities can then quickly be read by wireless devices in the wireless communication network and be reported to a serving radio network node such as a RCN or RN. The serving radio network node can then identify neighbor cells and radio network nodes.

A study item for the new 5G radio access technology, entitle New Radio (NR) or New Radio access Technology (NRAT) has been started in 3GPP. It is being assumed from the beginning that NR should be designed as a single technical framework to address all usage scenarios for evolved Mobile Broadband (eMBB) and Machine Type Communication (MTC), such as massive MTC (mMTC) and ultra-reliable MTC (uMTC). The support for all these services is not expected to be standardized in the first release(s), therefore, NR is required to be future proof i.e. NR should have the property of being enhanced by the introduction of new features, the enhancement of existing features and/or the introduction of new services. LTE design can be considered future-proof, which can be acknowledged by large amount of new features that were introduced such as enhanced Inter-cell interference coordination (eICIC), Coordinated multipoint (CoMP), Demodulation-Reference Signal (DMRS), relaying, enhanced MTC (eMTC) (incl. Cat 1/0), License Assisted Access (LAA), WiFi integration, Carrier Aggregation, Dual Connectivity while still supporting multiplexing with legacy Release 8 wireless devices. In addition to these features, 3GPP has managed to introduce new services to the LTE, such as NarrowbBand Inter of Things (NB-IoT) and Vehicle to everything (V2X) communication. However, it has been observed that changes to frame structure or reference signal design were difficult or even impossible to do in a fully backwards compatible manner. This is in particular due to the fact that legacy wireless devices may expect that regarding Cell-Specific Reference Signals (CRS) which have the following characteristics:

- CRSs are constantly broadcasted in every subframe;
- CRSs are transmitted in every Physical Resource Block (PRB), i.e. over the whole bandwidth for each deployed carrier.

LTE wireless devices use CRSs for various purposes including channel estimation, e.g. for data demodulation and Physical Downlink Control Channel (PDCCH) decoding, as well as for accurate Channel State Information (CSI) measurements. And while frequently transmitted reference signals (RS) across the entire carrier bandwidth are well justified for that purpose, Radio Resource Management (RRM) measurements, such as Reference Signal Received Power (RSRP)/Reference Signal Received Quality (RSRQ) could be done with less frequent signals and indeed typically wireless device implementations use just a limited number of CRSs in time and frequency to perform neighbor cell measurements.

Considering that frequently transmitted signals cause inter-cell interference and consume energy on the network side, it appears desirable to reduce the reference signals transmitted solely for the purpose of RRM measurements, i.e., when no data or control signalling need to be transmitted. That is the case e.g. when the wireless device is in Idle mode or state meaning e.g. that the wireless device is trying to find and maintain a service and connected mode means e.g. that the wireless device is or will transfer data of a service. License Assisted Access (LAA) Rel-13, and "Small Cell On/Off" (Rel-12) rely on so-called Discovery Reference Signals (DRS) which only appears once every 40, 80 or 160 ms and comprise Primary Synchronization Signal (PSS), Secondary synchronization signal (SSS) and CRS. Wireless devices supporting these features can be configured to perform their RRM measurements only based on DRS rather than on continuous CRSs. If only such wireless devices operate on a carrier, the radio network node may choose to omit the frequently transmitted CRSs. Similar optimizations should be explored for the design of reference signals used for active mode mobility measurements in NR.

Requirements for reference signals used for RRM measurements might not be the same when used in IDLE, e.g. to support cell reselection, and CONNECTED, e.g. to support beam-based mobility/handover. To support wireless device-based mobility, e.g. cell reselection, in IDLE a wireless device could rely on signals transmitted in wide beams and/or Single Frequency Network (SFN) fashion. The reason is that there is no high gain beamforming since there is no high data rates transmission in that state. These signals would also be part of the so-called "always on" signals that should be minimized in NR, especially when there are no active wireless devices. Therefore, it is interesting to reduce the amount of these signals and/or transmit them less often. The signal could be the same sync source as in LTE (e.g. PSS/SSS) and possibly not to be transmitted very often, e.g. 100 ms, so energy can be efficiently used.

On the other hand, signals to support mobility in CONNECTED mode need to rely on a higher level of beamforming and likely be transmitted more often.

One solution is that a cell ID is transmitted and used for both IDLE and CONNECTED wireless devices. Based on the cell ID the wireless device is able to read system information and know which beam reference signals (BRS) associated to that cell ID it should look for. In the solution, beams transmitted in IDLE are the same transmitted/used in Connected although, as discussed before, these would not be needed in areas/periods with no active wireless devices. As shown in FIG. 2, synchronizations signals comprise PSS/SSS and possible extended synchronization signal (ESS), similar to as defined in LTE. Based on that the wireless device is able to derive a Physical Cell ID (PCI) and as in LTE, SSS sequence occupies 6 consecutive PRBs.

The design of highly configurable Mobility Reference Signals (MRS) only transmitted "on demand" is a solution to the need for a lean design, which is future proof and energy efficient. However, it has been identified that some kind of periodic reference signals are necessary, in addition to the on demand MRSs. The latest RAN agreements from RAN2#95 state the following:

1 In connected active mode one may use non-wireless device specific RS for measurements (wireless device may not need to be aware whether the RS is wireless device-specific or non-wireless device specific).

2 The non-wireless device specific RS can be found by the wireless device without much configuration.

3 The non-wireless device specific RS encodes an identity

The problem is that the introduction of these non-wireless device specific and possibly RSs reminds some of the CRS properties needed for a change. For example, the use of a constant transmission, even though possibly transmitted sparse in time, which may lead to a system which is not lean or future proof.

At the same time, even sparser transmissions of the synchronization signals and reference signals may be needed in areas where only Idle/inactive wireless devices are present in order to enable very long Discontinuous Reception (DRX) configurations that enable network energy efficiency features. In LTE, an Idle wireless device camps on the best cell where a cell is defined by its synchronization signals, e.g. PSS/SSS. Upon detecting and synchronizing with the PSS/SSS the wireless device knows the cell ID, e.g. PCI, and is able to acquire system information so the wireless device can access the cell. Hence, PSS/SSS serves the purpose of an idle mode synchronization signal.

In LTE, the PSS/SSS is transmitted every 5 ms. However, in many scenarios, some periods of the day and/or some specific areas, cells have a quite low traffic so that the network consumes a lot of energy due to these frequent transmissions. Therefore, there is a consensus among vendors and operators that the design of NR signal(s) should allow energy efficiency mechanisms at the network side, especially in low traffic scenarios where most of the wireless devices are in sleeping state. In working group RAN2, for example, one of the agreed design principles for system information distribution in NR, for example, goes in that direction, as shown below:

. . .

2 System information broadcast should allow configurations that enable network energy efficiency, e.g. by long DTX durations.

. . .

NR signal(s) should allow energy efficiency mechanisms at the network side.

Long Discontinuous Transmission (DTX) cycles are particularly important when there are not active wireless devices to be served by a given Transmission/Reception Point (TRP). Therefore, a direct consequence of that agreement is that the periodicity of the idle mode synchronization signal denoted "xSS", as well as the minimum system information that is broadcasted associated to the xSS, should be configurable to allow a long DTX duration e.g. 100 ms. At the same time, idle mode procedures such as cell selection, cell reselection, system information acquisition and initial access shall still be able to fulfil NR requirements.

Thus, periodicity of the idle mode synchronization signal should allow long DTX configurations e.g. 100 ms. In LTE, some steps in that direction have already been taken for unlicensed spectrum operation. Frequent transmission, e.g. every 5 ms, of idle mode signals are not allowed and sparser transmissions are utilized. Such a sparse transmission scheme has been introduced in LAA, and is also being introduced in MuLTEFire. Already from the beginning, NR should be designed to operate in unlicensed bands, as well as under other licensing schemes.

LTE allows the sparse transmission of idle signals such as in LAA and MuLTEFire. As it has been done in LTE, to fulfil the requirements on idle mode procedures with sparsely transmitted synchronization signals, additional functionality may have to be introduced on the network side. For instance, the network may provide a measurement window, similar to the Discovery Signal Measurement Timing Configuration (DMTC) window in LAA, to aid the wireless device during cell reselection, and the network then ensures that all relevant idle mode synchronization signals are transmitted in that measurement window.

A consequence of the previous described scenario is that idle mode procedures in NR, and/or inactive 'state', should be designed to properly operate with sparsely transmitted, e.g., every 100 ms, synchronization signals. However, this may reduce the performance in certain scenarios where the concern of energy efficiency is not the same as in the previously described case since the presence of active wireless devices will anyway enforce the network to disable the long DTX cycles. Hence, transmissions of reference signals may not be signaled in an optimum manner.

SUMMARY

An object of embodiments herein is to provide a mechanism that improves the performance of the wireless communication network by an efficient signaling of reference signals in the wireless communication network.

According to an aspect the object is achieved by providing a method performed by a radio network node for handling signaling in a wireless communication network. The radio network node transmits synchronization signals with a first periodicity for wireless devices in a service area of the radio network node. The radio network node detects one or more wireless devices being in a connected mode and incoming from a handover, or moving to the connected mode within the service area or within a neighborhood of the radio network node. The radio network node triggers, in response to detecting the one or more wireless devices, a transmission of additional reference signals for performing measurements on.

According to another aspect the object is achieved by providing a method performed by a wireless device for handling measurements of signals in a wireless communication network. The wireless device searches for synchronization signals transmitted with a first periodicity. The wireless device further searches, when being in a connected mode, for additional reference signals for performing measurements on. It is furthermore provided herein a computer program comprising instructions, which, when executed on at least one processor, cause the at least one processor to carry out any of the methods above, as performed by the radio network node or the wireless device. It is additionally provided herein a computer-readable storage medium, having stored thereon a computer program comprising instructions which, when executed on at least one processor, cause the at least one processor to carry out the method according to any of the methods above, as performed by the radio network node or the wireless device.

According to yet another aspect the object is achieved by providing a radio network node for handling signaling in a wireless communication network. The radio network node is configured to transmit synchronization signals with a first periodicity for wireless devices in a service area of the radio network node. Furthermore, the radio network node is configured to detect one or more wireless devices being in a connected mode and incoming from a handover, or moving to the connected mode within the service area or within a neighborhood of the radio network node. The radio network node is configured to trigger in response to detecting the one or more wireless devices, a transmission of additional reference signals for performing measurements on.

According to still another aspect the object is achieved by providing a wireless device for handling measurements of signals in a wireless communication network. The wireless device is configured to search for synchronization signals transmitted with a first periodicity. The wireless device is further configured when being in a connected mode to, search for additional reference signals for performing measurements on.

By transmitting additional reference signals to one or more wireless devices being in a connected mode and incoming from a handover, or moving to the connected mode within the service area or within the neighborhood of the radio network node, the one or more wireless device may improve the performance during these scenarios where energy efficiency is of less importance. The embodiments herein have the potential to introduce a lean design even when periodic additional reference signals need to be transmitted. Thus, this results in an efficient signaling of reference signals leading to an improved performance of the wireless communication network.

BRIEF DESCRIPTION OF THE DRAWINGS

Embodiments will now be described in more detail in relation to the enclosed drawings, in which.

DETAILED DESCRIPTION

Figure 1:
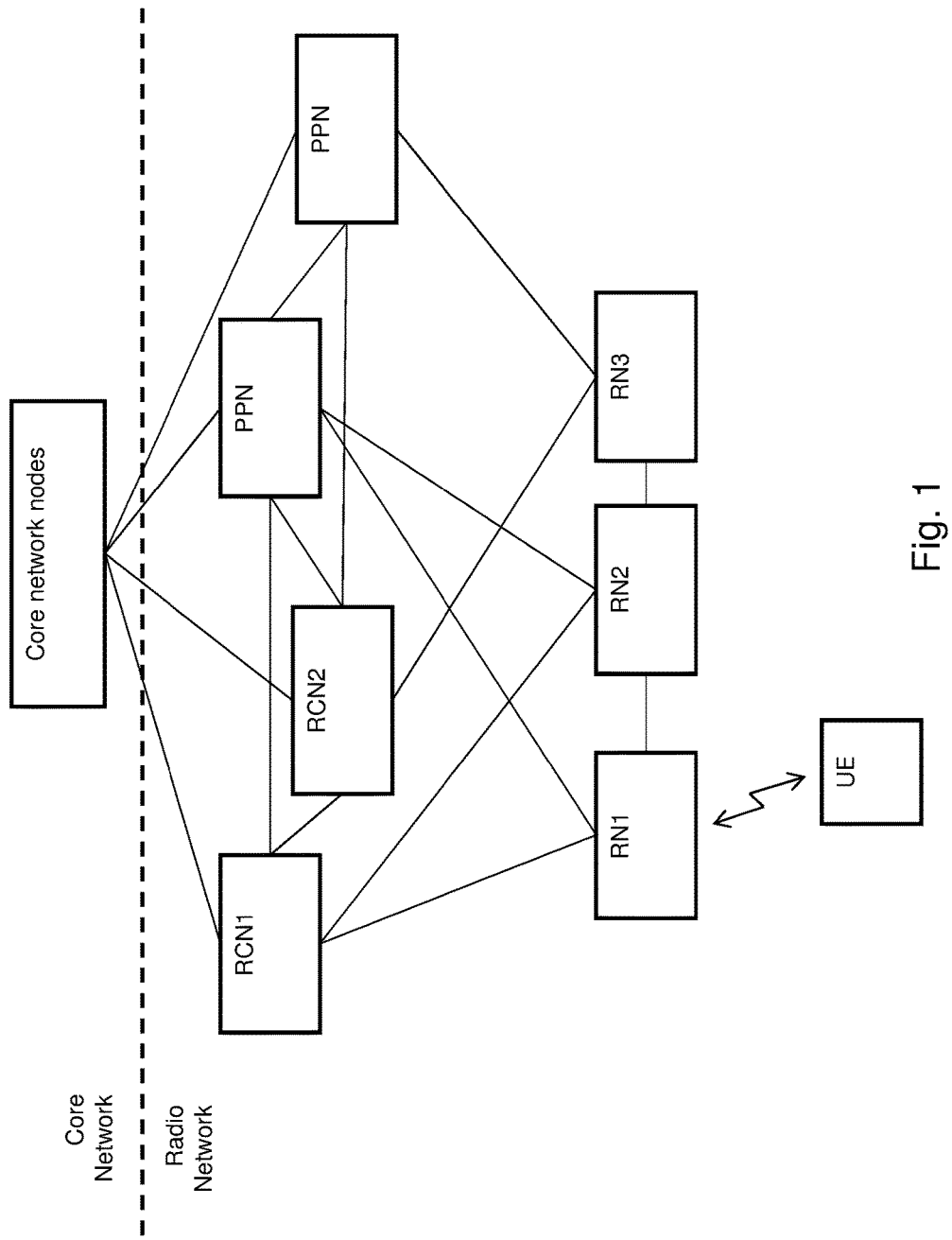
FIG. 1 shows an schematic overview of a network architecture for 3GPP 5G New Radio (NR)
Figure 2:
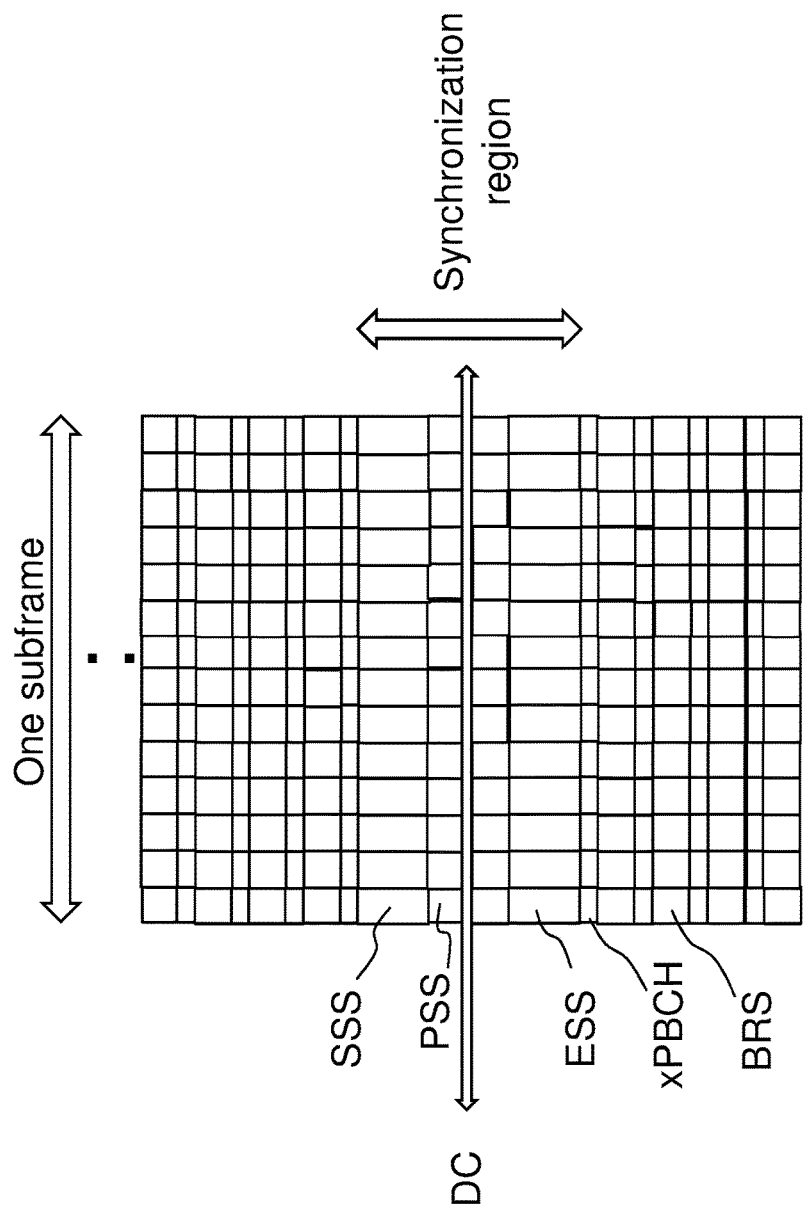
FIG. 2 shows an overview synchronization signals in a subframe.
Figure 3A:
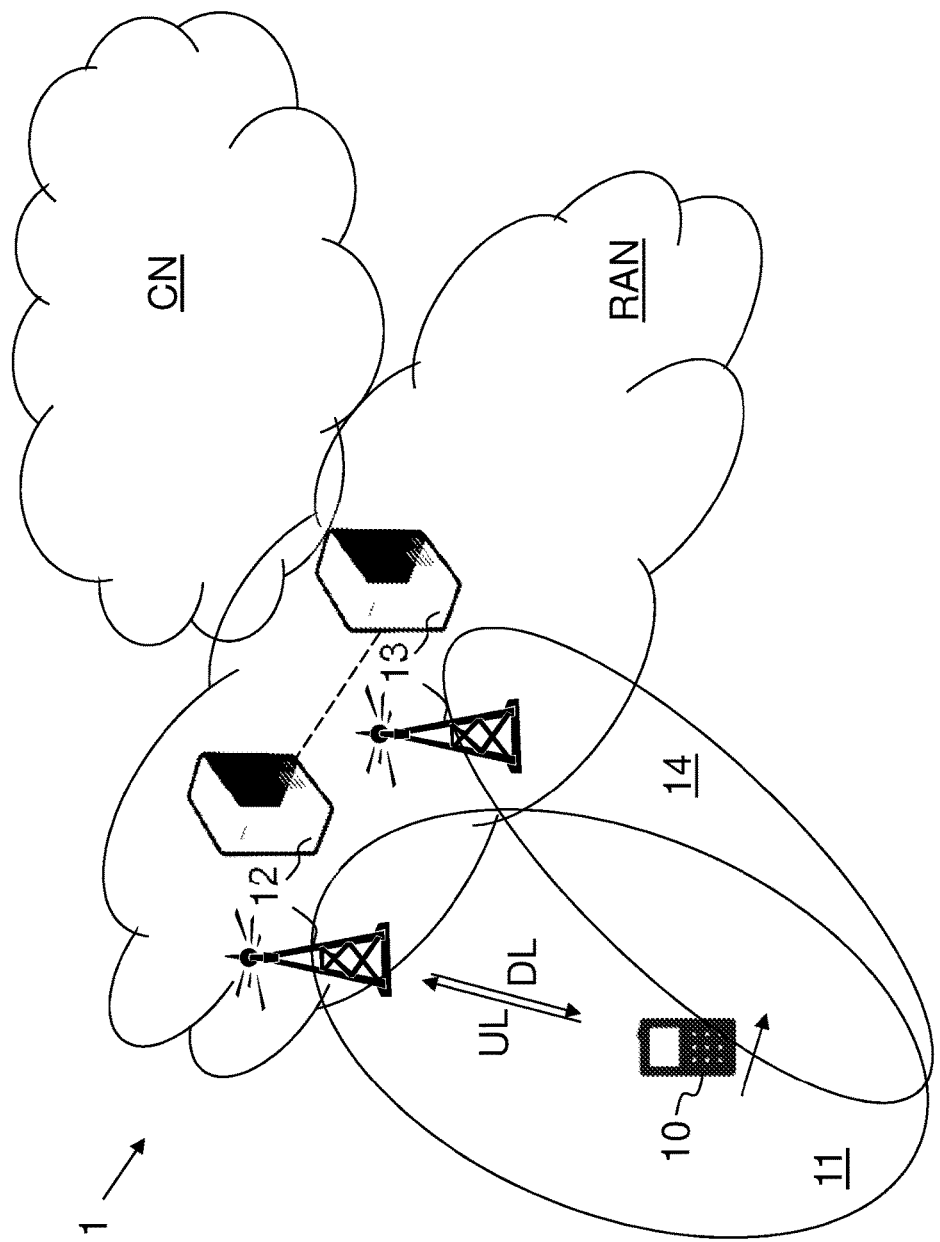
FIG. 3A is a schematic overview depicting a wireless communication network according to embodiments herein.

Embodiments herein relate to wireless communication networks in general. FIG. 3A is a schematic overview depicting a wireless communication network 1. The wireless communication network 1 comprises one or more RANs and one or more CNs. The wireless communication network 1 may use one or a number of different technologies, such as Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in a further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node.

The wireless communication network 1 comprises radio network nodes, e.g. a first radio network node 12, providing radio coverage over a geographical area, a first service area 11, of a first radio access technology (RAT), such as LTE, Wi-Fi, WiMAX or similar. The first radio network node 12 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the first network node 12 depending e.g. on the first radio access technology and terminology used. The first radio network node 12 may alternatively or additionally be a controller node or a packet processing node such as a radio controller node or similar. The first network node may be referred to as a serving network node wherein the first service area may be referred to as a serving cell, and the serving network node communicates with the wireless device 10 in form of DL transmissions to the wireless device 10 and UL transmissions from the wireless device 10.

The wireless communication network 1 comprises additional radio network nodes, such as a second radio network node 13, providing radio coverage over a geographical area, a second service area 14, of a second radio access technology (RAT), such as LTE, Wi-Fi, WiMAX or similar. The second radio network node 13 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the first radio access technology and terminology used. The second radio network node 13 may alternatively or additionally be a controller node or a packet processing node such as a radio controller node or similar. The second radio network node 13 may be referred to as a neighboring radio network node to the first radio network node 12, and the first radio network node 12 is a neighbor radio network node to the second radio network node 13, wherein the second service area may be referred to as a neighboring cell. The wireless device 10 may be in a non-connected mode such as Idle or inactive mode in the first service area and is served by the first radio network node 12, or may be in connected mode and move towards the second service area. The radio network nodes communicate in form of DL transmissions to the wireless device 10 and UL transmissions from the wireless device 10.

It should be noted that a service area may be denoted as cell, beam, beam group or similar to define an area of radio coverage. The first and second RAT may be the same RAT.

A radio network node, such as the first radio network node 12 or the second radio network node 13, first transmit synchronization signals to wireless devices in respective service area with a first periodicity such as every 100 ms. This may be the case when no connected wireless devices are present and denoted as transmission of idle mode synchronization signals, xSS.

According to embodiments when one or more wireless devices are in a connected mode and incoming from a handover to e.g. the second radio network node 13, or are moving to the connected mode within the service area or within a neighborhood of the radio network node e.g. the first radio network node, the radio network node, e.g. the second radio network node 13 or the first radio network node 12, triggers a transmission of additional reference signals to perform measurements on.

For example, the radio network node, which may not be serving one or more wireless devices in Radio Resource Control (RRC) Connected mode or active wireless device, transmits very sparse synchronization signals (SS), denoted herein also as xSS or idle mode SS, e.g. with a periodicity of 100 ms or above a certain threshold, to enable e.g. inactive and/or idle wireless devices to perform wireless device based mobility or initial access acquisition of system information. The radio network node may detect the need to serve incoming wireless device moving to connected mode, also referred to as active wireless device or active mode, within its neighborhood, i.e. within it serving area or a neighboring service area, or wireless devices in connected mode are incoming to the service area of the radio network node. When the radio network node detects that there are connected one or more wireless devices in its vicinity, the radio network node triggers the transmission of additional reference signals (RS), possibly more frequently transmitted than the xSS, which additional references signals serve as reference signals for RRM measurements for the wireless device 10 being served by the radio network node. The additional RS may also serve as a synchronization source for the wireless device 10 in connected mode, as the PSS/SSS in LTE. When e.g. the radio network node is transmitting these additional RSs to serve connected wireless devices, in some embodiments, the radio network node may detect whether these additional RSs are still needed and in the case they are not, the radio network node may stop transmitting the additional RSs and/or may adjust periodicity of transmission of the additional reference signals e.g. by transmitting them in a more sparse way.

In idle mode procedures in NR (and/or inactive 'state') the system may be designed to properly operate with sparsely transmitted, e.g., every 100 ms, synchronization signals. However, connected mode synchronization signals may need to be more frequently transmitted than idle mode synchronization signals. In order to introduce the periodic additional RSs in NR to support RRC driven mobility and, at the same time, have a lean system with high energy efficiency and future proof-ness with sparse transmissions of Idle mode signals, embodiments herein define mechanisms on how to trigger the transmission of additional RSs for RRM measurements for wireless devices when needed.

The radio network node may coordinate with its neighbor radio network nodes, denoted AN-t's, e.g. the first radio network node 12 may coordinate with the second radio network node 13, to enable the triggering and de-activation the transmission of the additional RSs so that its connected wireless device(s) can perform measurements, via e.g. an inter-node interface such as the X2 interface. This inter-node interface process may continue until the wireless device 10 performs a handover towards another radio network node and may, based on the handover, activate subsequent neighbor radio network nodes to transmit additional reference signals.

Furthermore, some embodiments herein relate a scenario where the wireless device 10 performs a state transition from an inactive, and/or idle, mode to the connected mode. The wireless device 10 may, in response to transitioning to the connected mode, search for additional RSs e.g. within a certain time window, denoted as T_window, after entering RRC Connected or before its RRC Connected Re-configuration.

Different embodiments are herein disclosed that cover different deployment scenarios, configurations related to the Idle/Connected decoupling and mobility.

Herein xSS is referred as the synchronization signal used by wireless devices in e.g. RRC IDLE mode or INACTIVE mode or any other configuration of these states e.g. suspended mode to acquire DL synchronization, e.g. to enable a Physical Random Access Channel (PRACH) transmissions, and may be used to perform RRM measurements for cell reselection. The additional RS may be referred to as mobility reference signal, beam reference signal, synchronization signal used by Connected wireless devices to acquire DL synchronization with a neighbor radio network node, e.g. to enable a PRACH transmissions, and/or reference signal to perform RRM measurement on to support e.g. handovers, just to mention a few options. The synchronization signal may be used for synchronizing the wireless device 10 to the radio network node and the additional reference signals may be used for RRM measurements. Encoding and/or beamforming of the SS (or xSS) and additional RS may be performed in one or more of the following:

xSS and additional RS encode the same kind of identifier i.e. both encode the same identifier which can be a beam ID and/or a cell ID and/or a zone ID and/or a combination of cell ID+ beam ID, where a cell could be defined as a set of beams, derived directly or indirectly from the cell ID.

xSS and additional RS encode different identifiers i.e. permutation of cell ID, zone ID and beam ID may exist, for example, xSS may encode a cell ID while the additional RS can encode a beam ID. In another example the xSS encodes a cell ID while the additional RS encodes a combination of cell ID+ beam ID, where a cell could be defined as a set of beams, derived directly or indirectly from the cell ID.

xSS and additional RS are transmitted with the same beamforming configuration regardless if they encode the same identifiers or not. When xSS is transmitted in a single beam manner i.e. wide beam, possibly with repetition, the additional RS is also transmitted as a single/wide beam. When xSS is transmitted in a multi beam manner i.e. relying on some kind of beam sweeping, the additional RS is also transmitted as a multi-beam. In this case the sweeping configuration i.e. number of beams per sweeping period, etc. would also be the same in both cases.

xSS and additional RS are transmitted with different beamforming configuration regardless if they encode the same identifiers or not. For example, when xSS is transmitted in a single beam manner i.e. wide beam, possibly with repetition, the additional RS can be transmitted in a multi-beam manner. That might be beneficial in some scenarios where we want to reduce the overhead of transmitting the xSS (likely transmitted together with system information) in a beam sweeping manner. Even in the case where both are configured with multi-beam there could be some differences. The xSS could be defined with two beams per sweeping periods while much more granular beams could be defined for the additional RS to support mobility.

The method has the potential to introduce a lean design even when periodic additional reference signals need to be transmitted. In particular, the additional reference signals can be turned on/off depending on the specific needs.

Figure 3B:
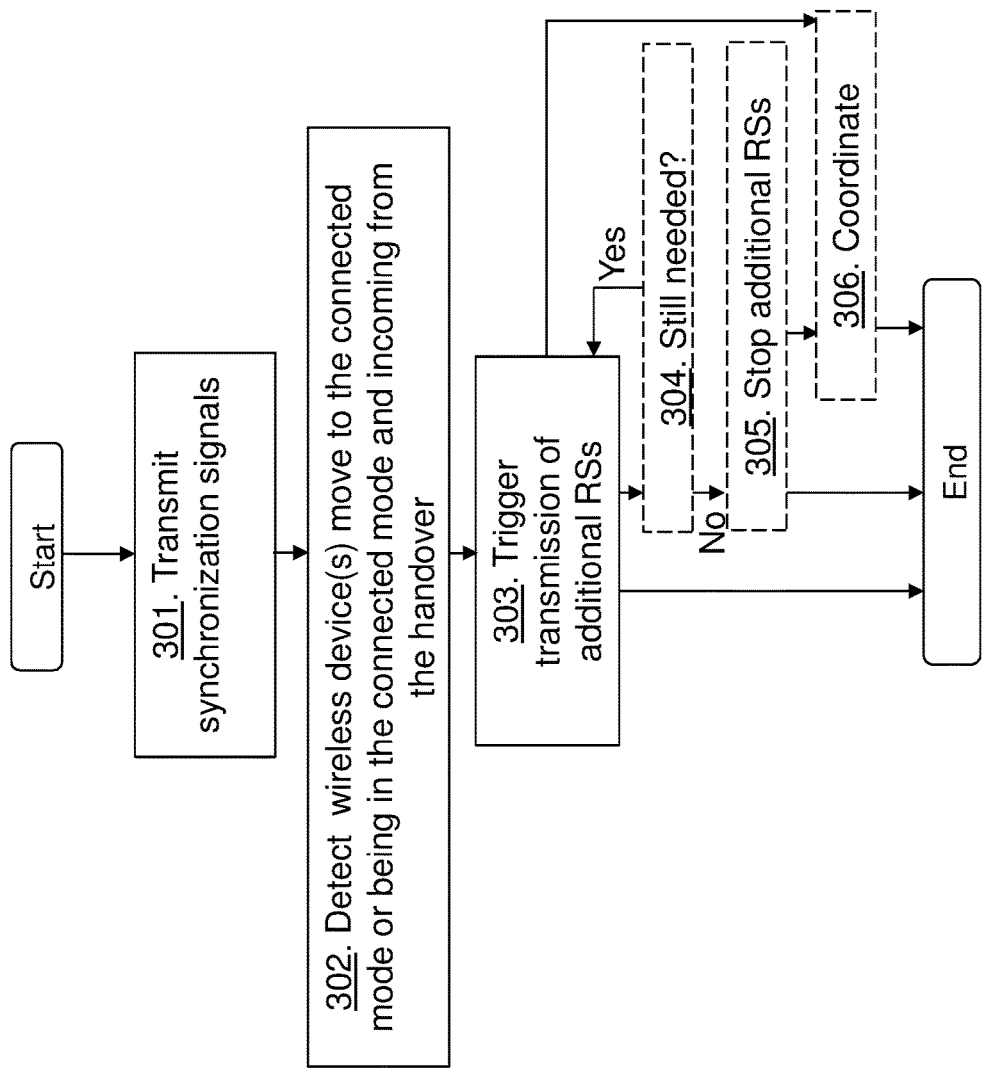
FIG. 3B shows a schematic flowchart depicting a method performed by a radio network node according to embodiments herein.

The method actions performed by the radio network node, such as the first radio network node 12 or the second radio network node 13, for handling signaling in the wireless communication network 1 according to some embodiments will now be described with reference to a flowchart depicted in FIG. 3B. The actions do not have to be taken in the order stated below, but may be taken in any suitable order. Actions performed in some embodiments are marked with dashed boxes.

Action 301. The radio network node transmits synchronization signals with the first periodicity for wireless devices in the service area of the radio network node. The synchronization signals may be transmitted when the one or more wireless devices are in an inactive or idle mode.

Action 302. The radio network node detects one or more wireless devices being in the connected mode and incoming from a handover, or detects one or more wireless moving to the connected mode within the service area or within a neighborhood of the radio network node. The radio network node may detect the one or more wireless devices being in the connected mode and incoming from the handover, or moving to the connected mode by receiving an indication from the one or more wireless devices or from another radio network node. The indication indicates that the one or more wireless devices move to the connected mode or being in the connected mode and incoming from the handover.

Action 303. The radio network node triggers, in response to detecting that the one or more wireless devices move to the connected mode or being in the connected mode and incoming from the handover, the transmission of additional reference signals for performing measurements on. E.g. the radio network node may transmit the one or more additional reference signals or may order another radio network node to start the transmission of additional reference signals. The synchronization signals may be transmitted when the one or more wireless devices are in the inactive or idle mode and then the transmission of additional reference signals is performed when the one or more wireless device move to the connected mode. The additional reference signals may be allocated to different radio resources than the synchronization signals. The additional reference signals may be transmitted with a second periodicity being smaller than the first periodicity of the synchronization signals. The additional reference signals may be transmitted in between the synchronization signals in time and with the first periodicity.

Action 304. The radio network node may determine whether the additional reference signals are still needed. For example, the wireless devices exit the service area or move to idle mode.

Action 305. The radio network node may, if not still needed, stop the transmission of the additional reference signals.

Action 306. The radio network node may coordinate with one or more other radio network nodes to adjust transmissions of the additional reference signals.

The additional reference signals may be used for radio resource management measurements.

Figure 3C:
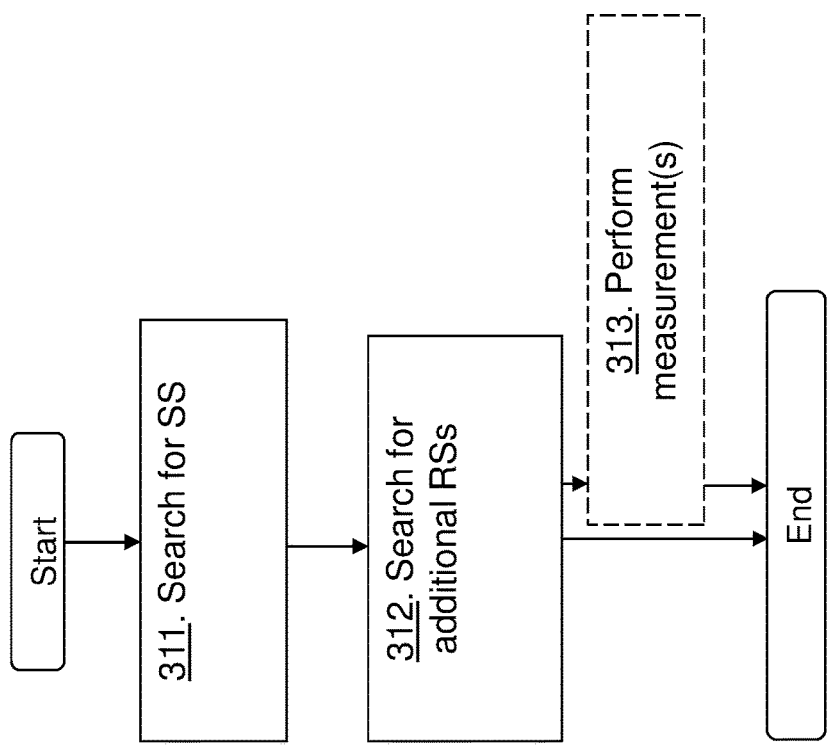
FIG. 3C shows a schematic flowchart depicting a method performed by a wireless device according to embodiments herein.

The method actions performed by the wireless device 10 for handling measurements of signals in the wireless communication network according to some embodiments will now be described with reference to a flowchart depicted in FIG. 3C. The actions do not have to be taken in the order stated below, but may be taken in any suitable order. Actions performed in some embodiments are marked with dashed boxes.

Action 311. The wireless device searches (also referred to as monitors) for synchronization signals transmitted with a first periodicity, e.g. 100 ms.

Action 312. The wireless device 10 further, when being in the connected mode, searches for additional reference signals for performing measurements on. E.g. upon transitioning to the connected mode or after a handover and being in the connected mode, the wireless device searches for the additional reference signals. The wireless device 10 may, when the synchronization signal are searched when being in an inactive or idle mode, search for the additional reference signals after transitioning to the connected mode. The additional reference signals may be allocated to different radio resources than the synchronization signals. The wireless device 10 may search for the additional reference signals with a second periodicity being smaller than the first periodicity of the synchronization signals, i.e. search more often e.g. every 5 ms. The wireless device 10 may search for the additional reference signals in between the synchronization signals in time and with the first periodicity.

Action 313. The wireless device 10 may then perform radio resource management measurements on the additional reference signals. The additional reference signals may in some cases not be used for synchronizing the wireless device to the radio network node.

Figure 4A:
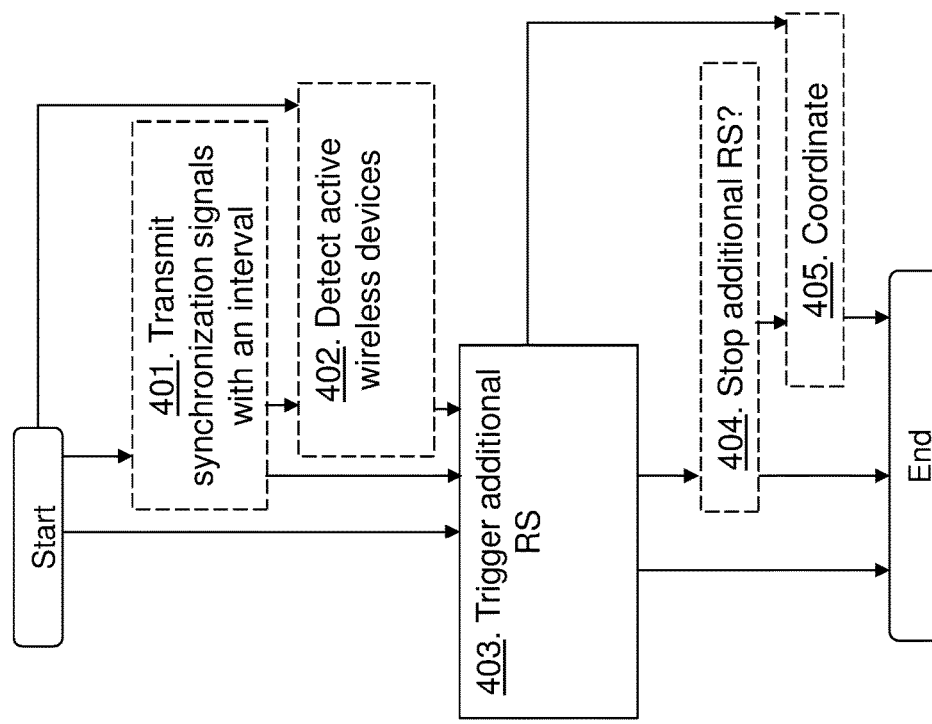
FIG. 4A shows a schematic flowchart depicting a method performed by a second radio network node according to some embodiments herein.

The method actions, according to some embodiments, may be performed by the radio network node, exemplified herein as the second radio base station 13, for signaling in a wireless communication network according to some embodiments will now be described with reference to a flowchart depicted in FIG. 4A. The actions do not have to be taken in the order stated below, but may be taken in any suitable order. Actions performed in some embodiments are marked with dashed boxes.

Action 401. The second radio network node 13, e.g. not serving one or more wireless devices in RRC Connected mode, e.g. active wireless devices, or similar, transmits very sparse synchronization signals (denoted here xSS) to enable e.g. inactive and/or idle wireless device to perform wireless device based mobility, initial access acquisition of system information. That is, the synchronization signals are transmitted with an interval above a threshold, e.g. transmitted every 100 ms. The second radio network node 13 does not have RRC Connected wireless devices under its responsibility and since the second radio network node 13 does not transmit the additional RS it might not be detected as a neighbor node for another wireless device connected to another AN-t such as the first radio network node 12. This signal can be transmitted in a single beam or in multiple beams. The second radio network node 13 may not be transmitting anything but simply performing the monitoring function on the action 402.

Action 402. The second radio network node 13 detects one or more wireless device moving to connected mode within its own second service area or within its neighborhood, such as the first service area, and/or detects that the connected or active wireless device 10 approaches the second area border or within its neighborhood, e.g. receiving an indication from the first radio network node 12 stating that the wireless device 10 is approaching or receiving a preamble for random access from the wireless device 10. In the case the second radio network node 13 is transmitting an xSS to serve Idle wireless devices it also monitors its PRACH activity, or any other uplink channel receiving information from wireless devices that require these DL reference signals, in order to detect incoming wireless devices, in the case this second radio network node 13 transmits the xSS. Upon receiving the preamble the second radio network node 13 may detect an incoming wireless device 10 and turn on the additional RS to serve this wireless device 10, see action 403. The second radio network node 13 may also inform the wireless device 10 some configuration, time window related to the xSS, periodicity, etc. related to these signals that were not transmitted before i.e. detectable by that wireless device 10, see action 405.

In addition to monitoring its own PRACH resources the second radio network node 13 may also monitor PRACH resources of its neighbor AN-t's, e.g. the first radio network node 12, in the case the information is available (see below). In the case the second radio network node 13 is not transmitting the xSS the second radio network node 13 can still monitor the PRACH resources associated to neighbor if information regarding PRACH resources is available.

In the case multiple neighbor radio network nodes, AN-t's, use the same time-frequency resources, including the same resources as the second radio network node 13 itself, the second radio network node 13 can distinguish incoming wireless devices to the second radio network node 13 or another based on preamble partitioning. That may be beneficial as well in order to turn on more directional RSs or to adapt the RS periodicity, density, number of beams, etc. to the cases where the second radio network node needs to serve its own wireless devices or serve wireless devices connected to its neighbors.

It may also be the case that the second radio network node 13 has the possibility to activate e.g. 300 beams in a 120 degree sector like area. However, if it knows that the PRACH request is associated to a given specific neighbor radio network node, AN-t, the second radio network node 13 can select a subset of the additional RSs to turn on.

Action 403. The second radio network node 13 triggers, in response to detecting that the first radio network node 12 needs to serve connected wireless devices, the transmission of the additional RSs e.g. within the interval between synchronization signals. In a case where the second radio network node 13 transmits an xSS with some sparse configuration, e.g. every 100 ms, the second radio network node 13 may increase the periodicity (T) of the xSS based on the detection mechanisms described in action 402. In the case the second radio network node 13 detects one or more incoming wireless devices to its responsibility the second radio network node 13 may transmit the additional RSs with an interval of T_serving. In the case the second radio network node 13 detects incoming one or more wireless devices to one or more of its neighbor radio network nodes the second radio network node 13 may transmit the additional RS with a neighbor interval, T_neighbor, where T_neighbor could be different from T_serving e.g. in the case the measurement window, of wireless devices, for neighbors is different from what is required to acquire synchronization with its source radio network node, i.e. T_serving would need to be shorter.

In the case the additional RS is the same as the xSS, in a single-beam case, detection in action 402 could change the periodicity e.g. from 100 ms to 5 ms. In the case of multi-beam deployments xSS sparse transmissions would trigger a change in the sweeping periodicity.

Still in the case, the additional RS is the same as the xSS, detection in action 402 could trigger the additional transmissions of the same xSS but possibly with different beamforming configurations. The second radio network node 13 could be transmitting the xSS in a single beam, e.g. to avoid overhead of system information, and, upon detection described in action 402 the second radio network node 13 inserts the xSS in a multi-beam manner. The multi-beam configuration itself can differ from the cases where the second radio network node 13 is serving its own one or more wireless device compared to the case where the second radio network node 13 is serving wireless devices connected to the neighbor AN-t.

In the case the xSS and the additional RS are not the same, detection in action 402 could trigger the transmissions of the additional RS, which can possibly be with different beamforming configurations. The second radio network node 13 could be transmitting the xSS in a single beam, e.g. to avoid overhead of system information, and, upon detection described in action 402 the second radio network node 13 inserts the additional RSs in a multi-beam manner. The multi-beam configuration itself can differ from the cases where the second radio network node 13 is serving its own one or more wireless devices compared to the case where the second radio network node 13 is serving wireless devices connected to z neighbor AN-t.

In the case the additional RS is not the same as the xSS, the additional RS can be inserted in the same frequency domain resources the xSS were transmitted but possibly not transmitted in the xSS occurrences. In the case the xSS and additional RS are transmitted in different frequency resources that may not be needed.

In the case the additional RS is not the same as the xSS, the additional RS is possibly not transmitted in the xSS occurrences in the case the xSS and additional RS are transmitted in similar frequency resources and only multiplexed in time.

Embodiments herein relate to changing the periodicity of reference signals or insert one or more additional RS within the sparse periods of the xSS, however, alternatives may also exist. The second radio network node 13 may also transmit additional "one shot RS" signals to enable one shot measurements. The second radio network node 13 may either inform the wireless device about these e.g. via RRC signaling once the wireless device 10 is connected or even via system information so the wireless device 10 is aware of when signals are expected to come and how (periodic or one shot). The second radio network node 13 may decide to trigger "one shot" or periodic transmissions based on different aspect such as the backhaul quality between neighbors, PRACH quality reception, etc.

Action 404. The second radio network node 13 may detect whether these additional RSs are still needed and may then possibly stop the additional RS transmission. In the case of periodic transmission, the second radio network node 13 can monitor the existence of connected wireless devices under its responsibility and if not Connected wireless devices the additional RSs, or more frequent xSS transmissions, could potentially be stopped or transmitted more sparsely. Then the second radio network node 13 may detect whether it is serving other wireless devices connected to its neighbors. This is not necessary in the case of one shot measurements.

The detection can either be a handover executed from the second radio network node 13 to a neighbor radio network node AN-t associated to the last connected wireless device. Alternatively, the detection can be based on a timer where the second radio network node 13 activates the timer based on the PRACH activity and once the timer expires the additional RS transmissions are stopped (or periodicity is adjusted again). The timer can have different values for the cases of wireless devices accessing the second radio network node 13 compared to the case where the second radio network node 13 is serving a wireless device connected to a neighbor radio network node AN-t.

Action 405. The second radio network node 13 may coordinate with neighbor radio network nodes (denoted AN-t's) to adjust, e.g. turn on/off, additional RSs. An inter-node interface like X2 may be used between neighbor radio network nodes to exchange information necessary to trigger the transmission of additional RSs. During a learning phase e.g. when the radio network nodes have not yet established neighbor relation, the additional RSs are always transmitted.

In order to allow the triggering of additional RSs for neighbor radio network nodes AN-t that can be neighbor AN-t candidates for a given wireless device 10 there could be two possible alternatives. In a first alternative, the second radio network node 13 with its PRACH activity performs the detection explained in action 402 and can send an X2-like message to its neighbor radio network nodes requesting them to activate the additional RSs. Alternatively, instead of having that signaling over the X2-like to trigger the additional RS from neighbor radio network nodes one could exchange over X2-like interface the PRACH configurations so that AN's can monitor the PRACH of neighbors.

The AN-t may or may not have knowledge whether the neighbor AN-t's are transmitting these additional RSs or not. One alternative is that the AN-t subscribes for the additional RS transmission status of neighbor AN-t's.

An AN-t receiving a HO preparation from a neighbor AN may prepare its neighbors by sending the X2-like message so they can trigger the transmission of additional RSs in the case they are not being transmitted.

The described method keeps working in a state transition scenario, where the wireless device 10 is coming from Idle to Connected mode and in the handover scenario.

In the handover scenario, after receiving a HO command (with RRCConnectionReconfiguration) the wireless device 10 may send a RACH preamble to the second radio network node 13 indicated by the source first radio network node 12. Other neighbor radio network nodes may also be able to detect that PRACH preamble (when PRACH configurations are known) and activate their additional RS.

In the case the radio network nodes don't have the PRACH information and/or the PRACH coordination mechanisms is not existing the neighbor radio network node may rely on the method only based on the X2-like signaling i.e. the serving radio network node receiving an incoming wireless device from handover or state transition triggers an X2-like message requesting a neighbor radio network node to activate its periodic additional RS.

The methods also apply in different scenarios/deployments:

Single radio network node

Figure 4B:
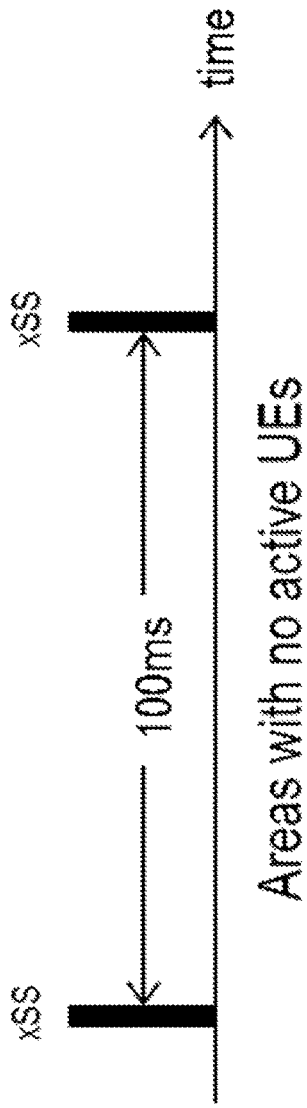
FIG. 4B shows a time interval between SS according to embodiments herein.

Single access node or single neighbor radio network node (AN-t): In one embodiment, a single neighbor radio network node without any wireless device in connected state monitors its PRACH channel that should be accessed by Idle wireless devices within that service area, see xSS transmissions in FIG. 4B. Upon receiving one or multiple random access preamble(s) in that channel the AN-t turn on its additional RS such as MRSs. That can be followed up by an RRC message to the wireless device 10 to configure measurements such as an RRC measurement configuration. Assuming this is a radio network node without connected wireless devices anyway, this is the time that RRM measurements will be needed i.e. mobility performance is not degraded and energy can be kept low in low traffic scenarios. That could be the case in an indoor deployment where in some periods of the day there are no active wireless devices. Upon receiving one or multiple random access preamble(s) in that channel, which is an indication of a wireless device moving to connected mode, the neighbor radio network node AN-t turn on its additional RSs. That can be followed up by an RRC message to the wireless device 10 to configure measurements such as an RRC measurement configuration. Assuming this is a radio network node without connected wireless devices anyway, this is the time that RRM measurements will be needed i.e. mobility performance is not degraded and energy can be kept low in low traffic scenarios. That could be the case in an indoor deployment where in some periods of the day there are no active wireless devices.

Figure 4C:
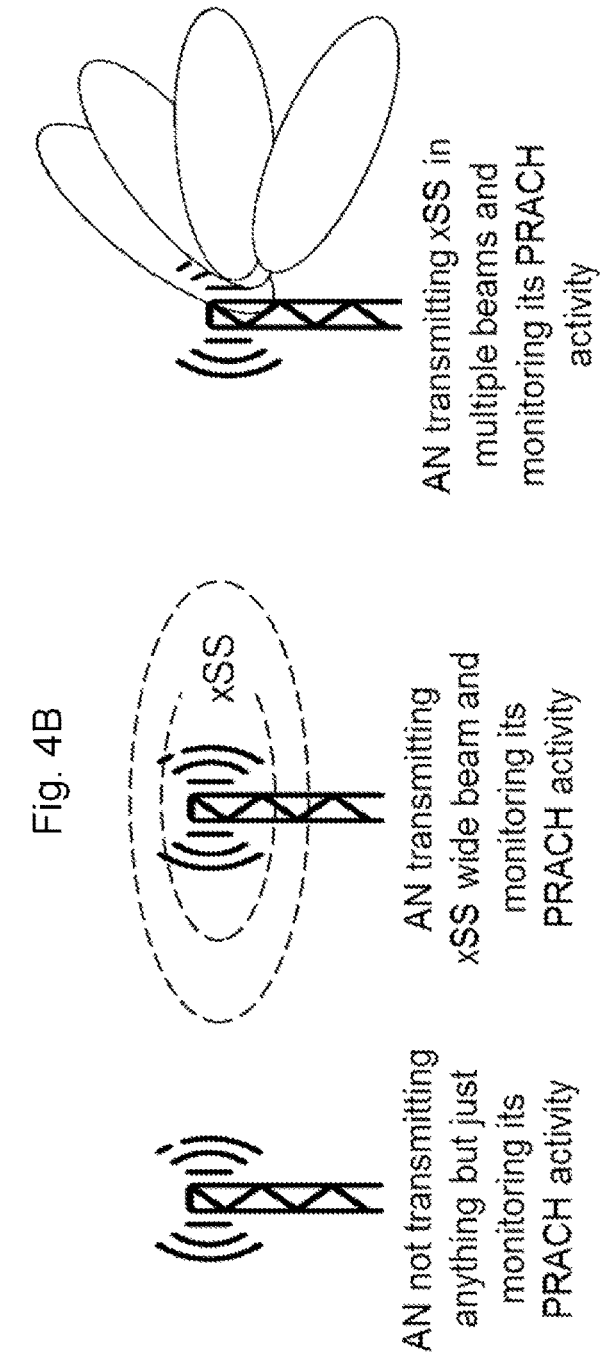
FIG. 4C shows different alternative radio network nodes or ANs according to embodiments herein.

Multiple neighbor radio network nodes, denoted AN-t(s): In another embodiment, multiple neighbor radio network nodes, AN-ts, without any wireless devices in Connected mode monitor the PRACH channel of neighbor radio network nodes in addition to monitoring their own PRACH channels. By monitoring the neighbor radio network nodes, the AN-t can detect that wireless devices are trying to access its own channel or neighbor radio network nodes i.e. it detects that there are wireless devices within its neighborhood that may need to further perform neighbor measurements. Upon the detection the neighbor radio network node AN-t can turn on its RSs. The AN may not be transmitting anything but just monitoring its PRACH activity. One AN may transmit xSS wide beam and monitoring its PRACH activity. One AN may be transmitting xSS in multiple beams and monitoring its PRACH activity, see FIG. 4C.

The method also covers the following mobility cases:
Static or semi-static i.e. wireless devices within the coverage area of a given neighbor radio network node (AN-t)
Pedestrian Mobility
High Mobility.

These cases or scenarios may be combined in different ones so that embodiments may cover the different combinations.

Note: the reference signals for RRM measurements may be denoted Mobility Reference Signals (MRS) as described in the NX report or Beam Reference signals (BRS).

Figure 4D:
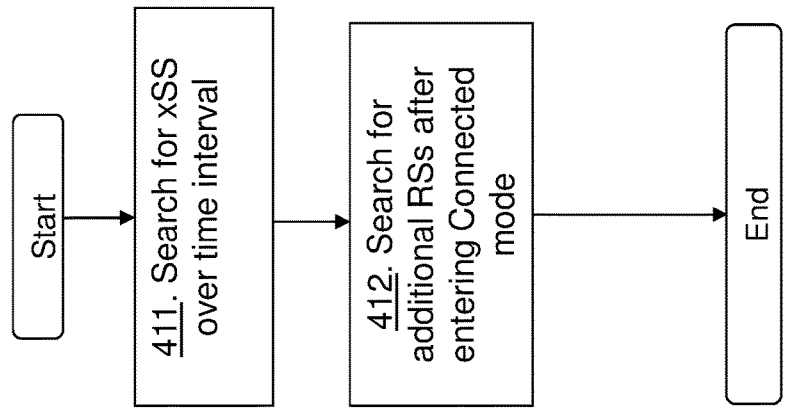
FIG. 4D shows a schematic flowchart depicting a method performed by a wireless device according to some embodiments herein.

An example of a method being performed by the wireless device 10 for handling signaling in a wireless communication network according to some embodiments will now be described with reference to a flowchart depicted in FIG. 4D.

Action 411. The wireless device 10, e.g. being in Idle or inactive mode, searches for one or more Synchronization signals over a time interval which time interval is above a threshold i.e. the xSSs are transmitted with a periodicity over a certain length e.g. longer than 40 ms.

Action 412. The wireless device 10 then searches for additional RSs within e.g. a certain time window, such as a time interval, after entering RRC Connected mode or active mode. The wireless device 10 may rely on e.g. PRACH preamble transmission during state transition or handovers. However, the wireless device 10 may benefit on additional configuration from the network e.g. when the second radio network node 13 provides the wireless device 10 with timing information related to additional RS's triggered by e.g. neighbor radio network nodes.

Note: A neighbor radio network node (AN-t) here should be seen as a logical entity and can also be extended to a carrier frequency where both are deployed in the same radio network node. In other words, different carriers in the same radio network node may have their PRACH resources configured differently and may also have the turn on and off strategy for reference signals.

The PRACH configurations from one radio network node compared to the other radio network node may differ in terms of the PRACH preambles utilized by neighbor radio network nodes but using the same time and frequency resources. That can simplify radio network node implementations so that a single PRACH Time and/or Frequency (T/F) resource is monitored by the radio network node i.e. its own PRACH resources and based on the preamble detection. If the detected preamble is one of its configured ones, the radio network node should turn on the additional RSs and also send a Random Access Response (RAR). Otherwise, if this is another preamble detected it should only turn on the additional RSs. Alternatively, the same preamble space can be used and PRACH can be multiplex using the T/F resources. As similar logic applies i.e. if the radio network node detects the preamble in another resource only additional RSs may be turned on.

Figure 5:
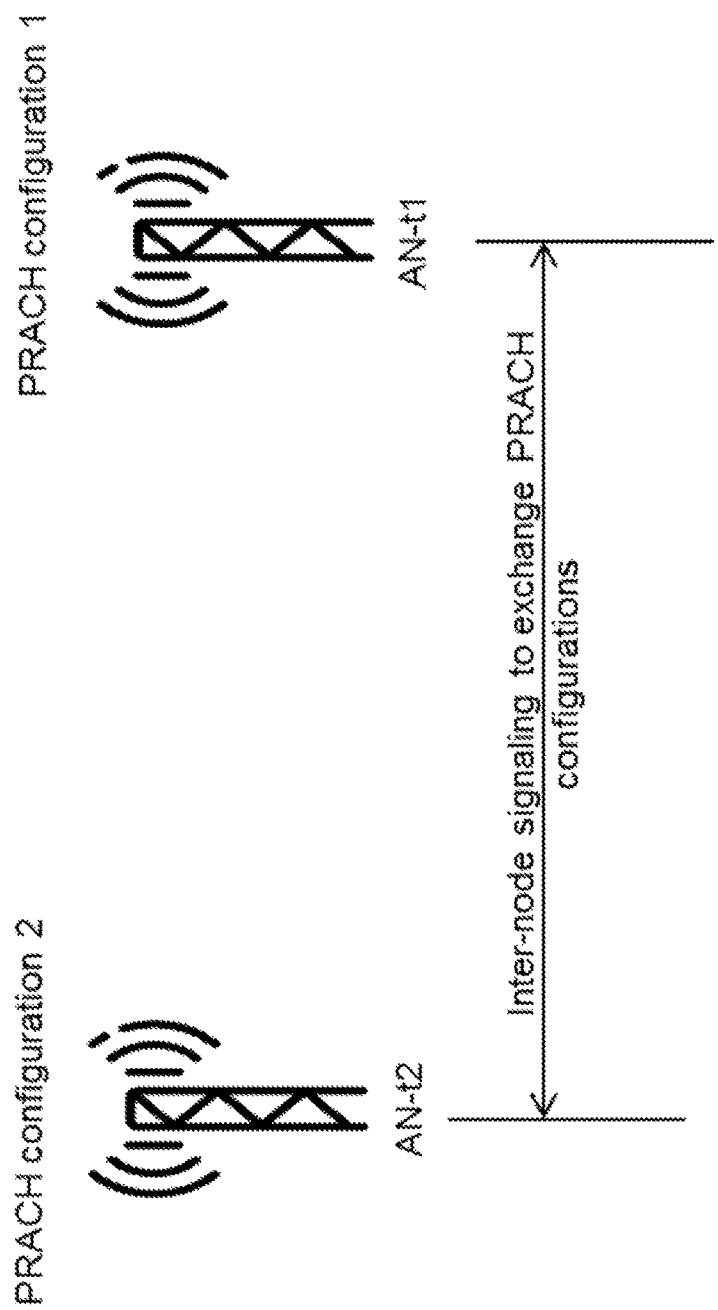
FIG. 5 shows a neighbor radio network node according to embodiments herein.

Especially in a distributed architecture, in order to support the method there needs to be some inter-node procedures where neighbor radio network nodes e.g. AN-t1 and AN-t2 exchange information about their PRACH resources so that they know which channel to monitor. That can be a standardized signaling over a X2-like interface or an information exchanged during the X2-like setup, see FIG. 5. In NR this new X2-like interface is sometimes called NG3 between two Next Generation eNBs (gNB)s. The preamble reception associated to another AN and/or configuration may trigger the neighbor radio network node to re-activate the X2-like connection which could also be in some dormant state e.g. to save memory in the radio network node(s).

Support for Mobility: When the wireless device 10 starts to move away from the coverage service area of a given neighbor radio network node RRM measurements should be triggered and reported to the serving radio network node. Once these reports are transmitted the wireless device 10 may receive a HO command from the source to move to a specific target radio network node. Then the wireless device 10 can be instructed to send a PRACH preamble associated to the PRACH configuration it has received from the source (or it has read from system information). Therefore, once the target radio network node detects that preamble it should send a random access response (RAR). Note that this radio network node has already its additional RSs turned on since the wireless device was able to be handed over to it, however, when the proposed method is applied, the neighbors of the radio network node will also be monitoring the PRACH preamble of the radio network node i.e. when the wireless device moves and hands over from one node to another the network will also be turning on MRSs with the wireless device movement.

Using established neighbor relations to increase robustness: In order to improve event further the robustness, the knowledge about neighbor relations can be used so that an radio network node not only turns its MRSs on when detected the wireless device wants to access it or access one of its detectable neighbors but also sends a message to its neighbour radio network nodes that might not have been detected. That can be beneficial in the case of high speed scenarios. That can be used if the network knows that this is an area with mobile wireless devices e.g. in a road where during the evening there are not many wireless devices but once they are there they move fast and may need some higher robustness.

In another embodiment both the xSS and the additional RS encode the same type of identifier such as a cell ID, a beam ID, a zone ID or a combination of these such as a beam ID+cell ID. The xSS=additional RS can encode the same ID and the additional transmissions explained herein can simply lead to the transmission of additional IDs of the same type but also the same values.

In another embodiment both the xSS and the additional RS encode the same type of identifier such as a cell ID, a beam ID, a zone ID or a combination of these such as a beam ID+cell ID but the additional IDs of the same type have different values.

In another embodiment both the xSS encodes one type of ID while the additional RS encodes another type of identifier such as a cell ID, a beam ID, a zone ID or a combination of these such as a beam ID+cell ID. For example, a given radio network node may transmit every 100 ms the cell ID encoded in the xSS and, upon the detection of wireless devices that need to be served the radio network node transmits additional RSs that encode beam IDs. The additional RS may also be an additional set of RSs of the same type such as a set of RSs encoding a set of beams.

In another embodiment the xSS encodes a cell ID and upon the detection of wireless devices that need to be served the radio network node transmits additional RSs encoding a beam ID are transmitted. These additional beam IDs can be transmitted from a physical layer perspective together with the xSS encoding the cell ID. In other words, in this embodiment there could be an association between additional RSs=beam IDs and xSS=Cell IDs so that every time a beam ID is activated (based on the detection mechanism) the xSS=cell ID is also transmitted e.g. the xSS could be a synchronization signal associated to a reference signal, such as a beam specific reference signal.

Figure 6:
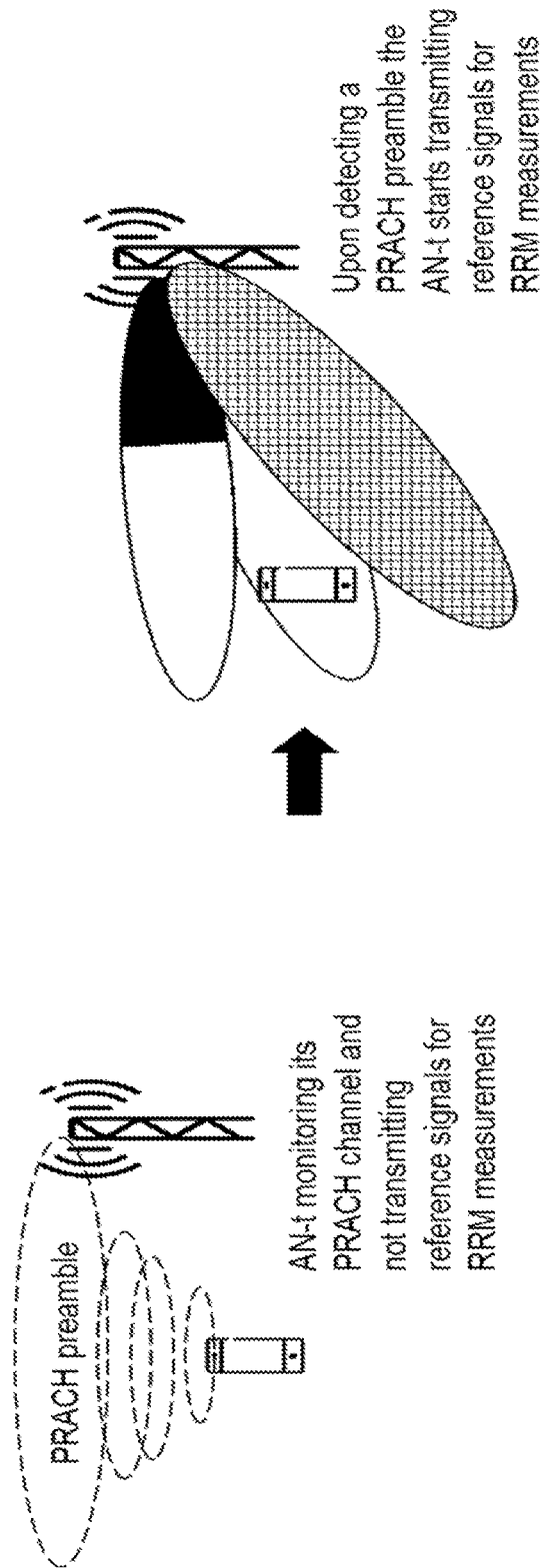
FIG. 6 shows a schematic overview depicting a scenario according to embodiments herein.

FIG. 6 shows a periodicity change and additional RS triggered by detection of wireless device that need to be served in the single beam case. The AN-t monitors its PRACH channel and does not transmit additional RS for RRM measurements. Upon detecting a PRACH preamble the AN-t may start transmitting additional RSs for RRM measurements.

Figure 7:
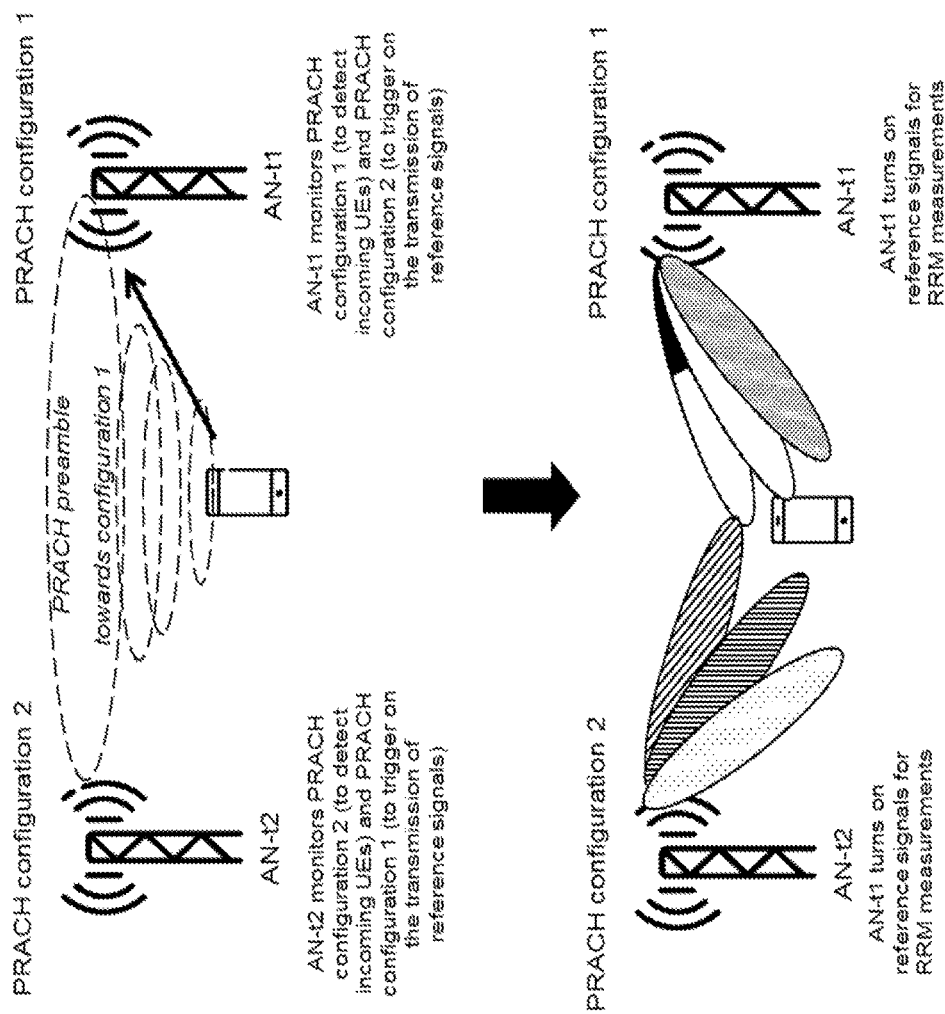
FIG. 7 shows a signalling scheme depicting a scenario according to embodiments herein.

FIG. 7 shows a periodicity change and additional RS triggered by detection of wireless devices that need to be served in the multi-beam deployment. AN-t1 comprises a PRACH configuration 1 and AN-t2 comprises a PRACH configuration 2. AN-t2 monitors PRACH configuration 2 (to detect incoming UEs) and PRACH configuration 1 (to trigger on the transmission of additional RSs). AN-t1 monitors PRACH configuration 1 (to detect incoming UEs) and PRACH configuration 2 (to trigger on the transmission of additional RSs). The AN-t1 turns on the additional RSs for RRM measurements. Upon detection, the An-t1 turns on additional reference signals for RRM measurements and the An-t2 turns on additional reference signals for RRM measurements.

Figure 8:
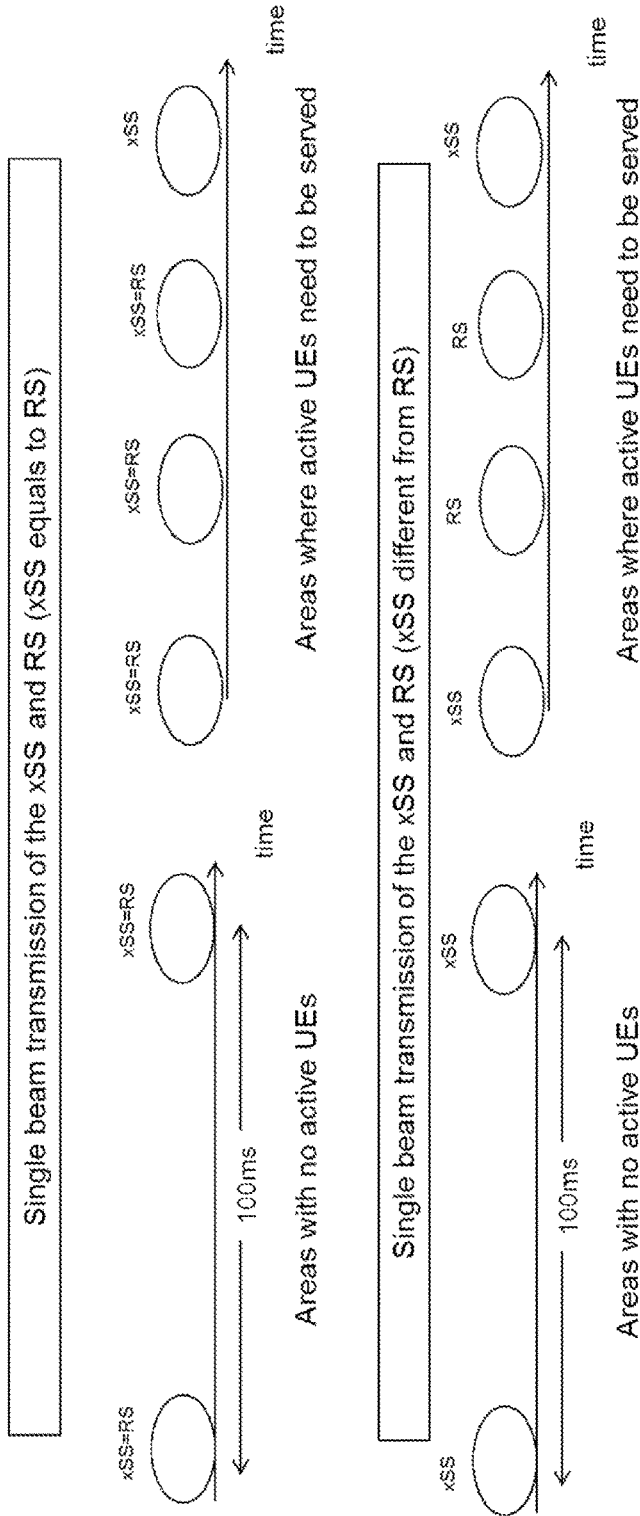
FIG. 8 shows an embodiment of reference signals/synchronisation signals according to embodiments herein.
Figure 9:
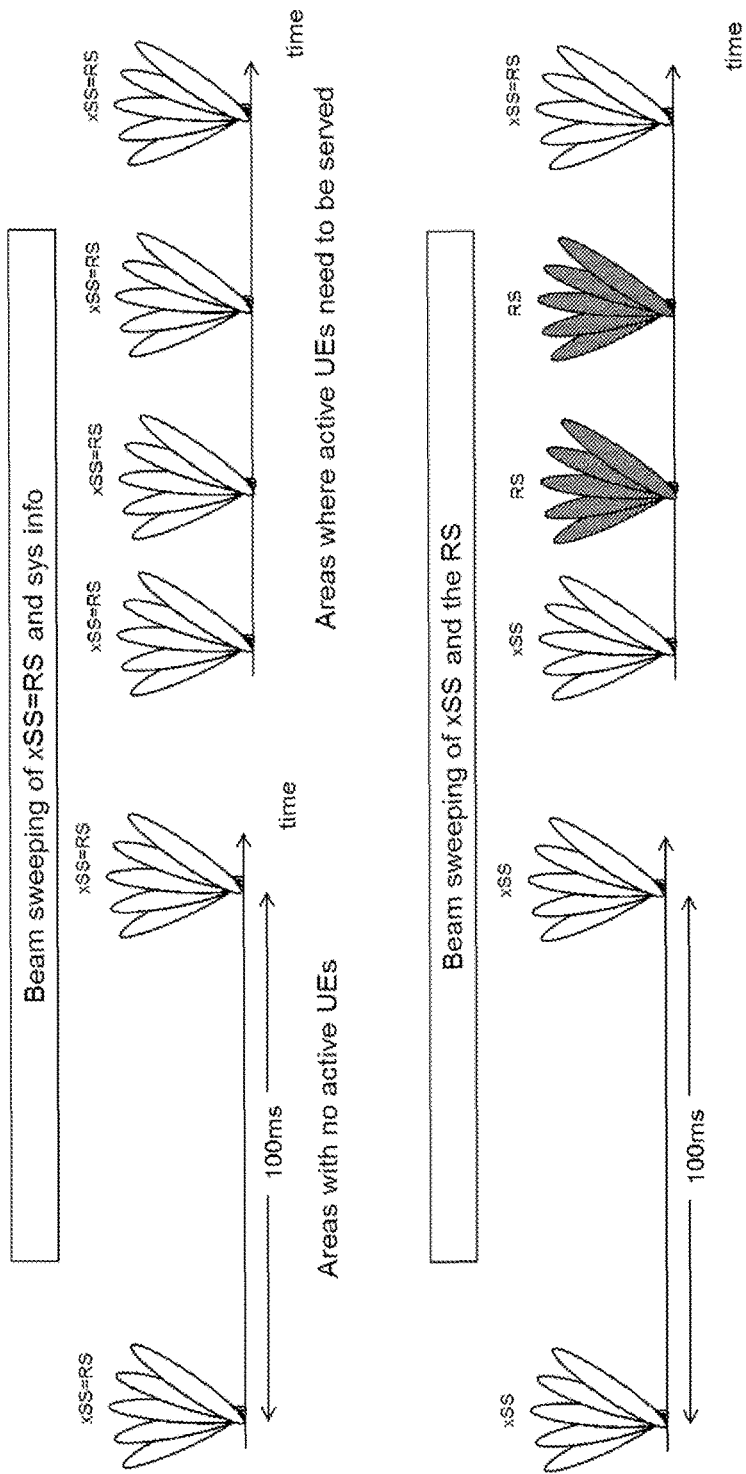
FIG. 9 shows an embodiment of beam sweeping according to embodiments herein.
Figure 10:
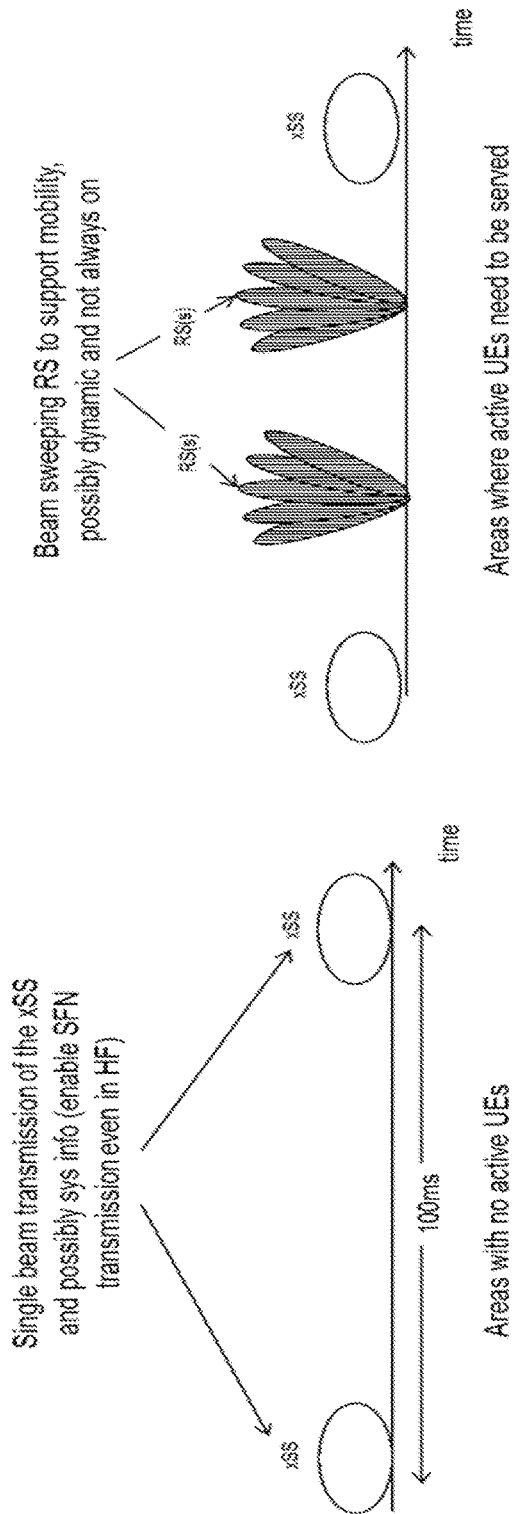
FIG. 10 shows a schematic a signalling according to embodiments herein.
Figure 11:
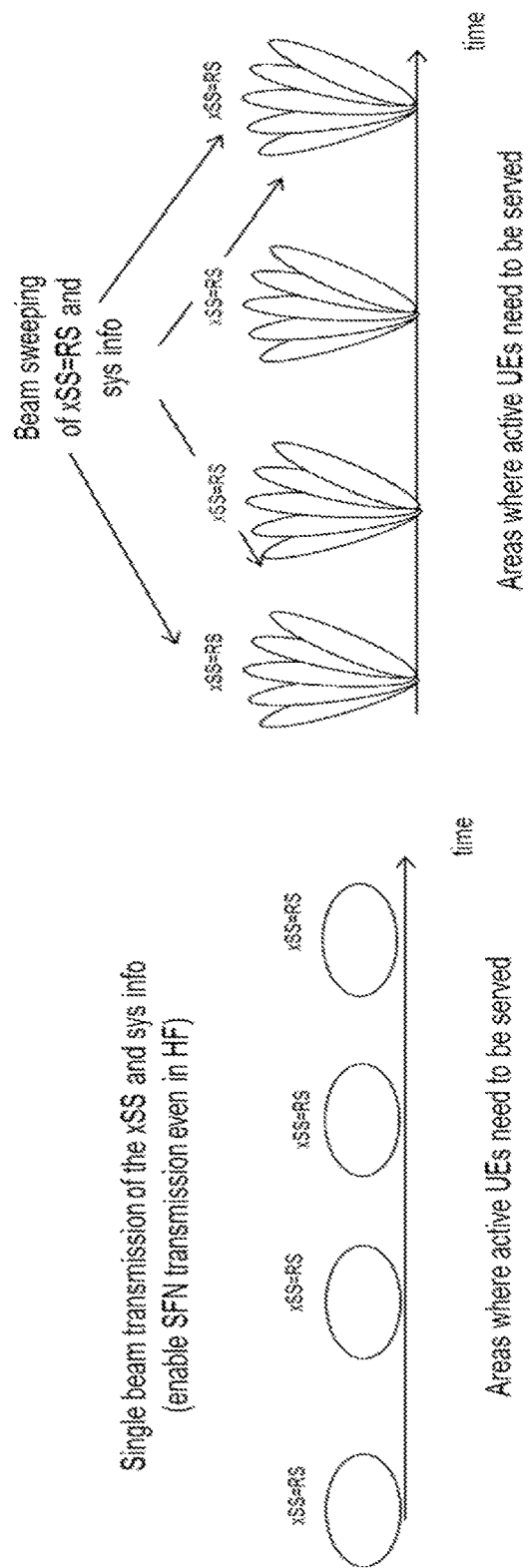
FIG. 11 shows a schematic a signalling according to embodiments herein.
Figure 12:
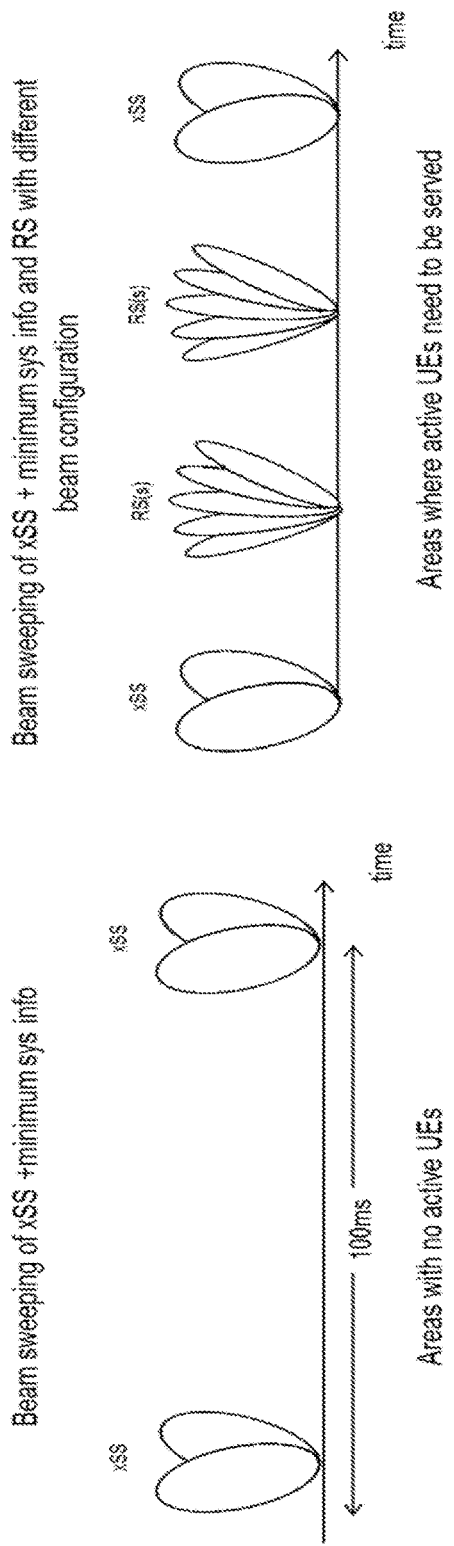
FIG. 12 shows a schematic a signalling according to embodiments herein.

FIGS. 8-12 shows different ways to employ embodiments herein. FIG. 8 shows a an implementation wherein single beam transmissions of the xSS and the additional RS are used (on top: xSS equals to RS; below: xSS different from RS). FIG. 9 shows beam sweeping of xSS=RS and system information (Sys info), and beam sweeping of xSS and the RS. FIG. 10 shows a single beam transmission of the xSS and possible sys info (enable SFN transmission even in High Frequency (HF)). Beam sweeping additional RS to support mobility possibly dynamic and not always on. FIG. 11 shows a single beam transmission of the xSS and sys info (enable SFN transmission even in HF). Beam sweeping of xSS=RS and sys info. FIG. 12 shows beam sweeping of xSS+minimum sys info (enable SFN transmission even in HF). Beam sweeping of xSS+minimum sys info and RS with different beam configuration It is herein shown a method performed by e.g. a second radio network node for signaling. The second radio network node transmits one or more additional reference signals when a wireless device transfers from an idle mode to a connected or active mode. It is herein shown a method performed by a wireless device for signaling in a wireless communication network. The wireless device, being not connected or inactive, searches for one or more Synchronization signals. The wireless device then searches for additional RS within a certain time window after entering RRC Connected mode or active mode. Furthermore are a second radio network node and a wireless device provided, which second radio network node and wireless device are configured to perform the methods herein. It is herein shown a second radio network node for signaling. The second radio network node is configured to transmit one or more additional reference signals when a wireless device transfers from an idle mode to a connected or active mode. It is herein shown a wireless device for signaling in a wireless communication network. The wireless device, being in an inactive mode, is configured to search for one or more Synchronization signals over a time interval which time interval is above a threshold. The wireless device is further configured to search for additional RS within a certain time window such as the time interval after entering RRC Connected mode or active mode.

Figure 13:
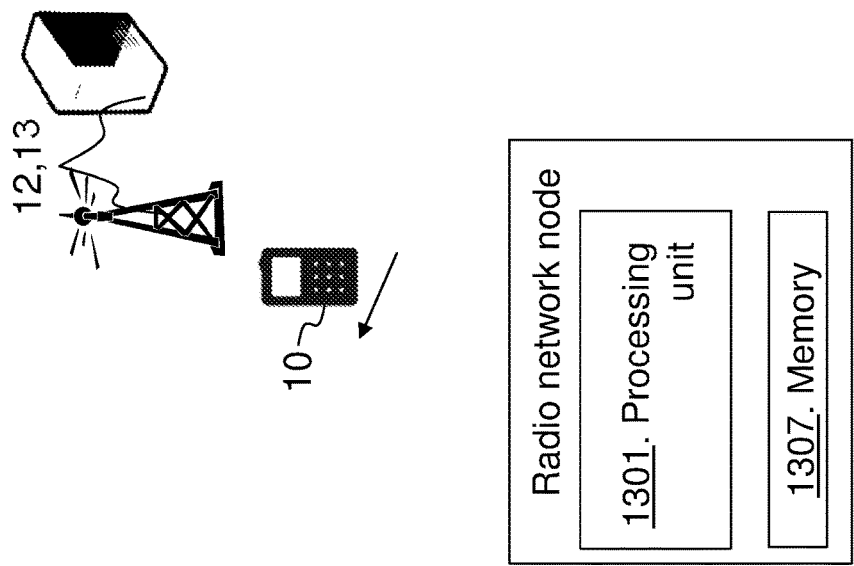
FIG. 13 is a block diagram depicting a radio network node according to embodiments herein.
Figure 13:
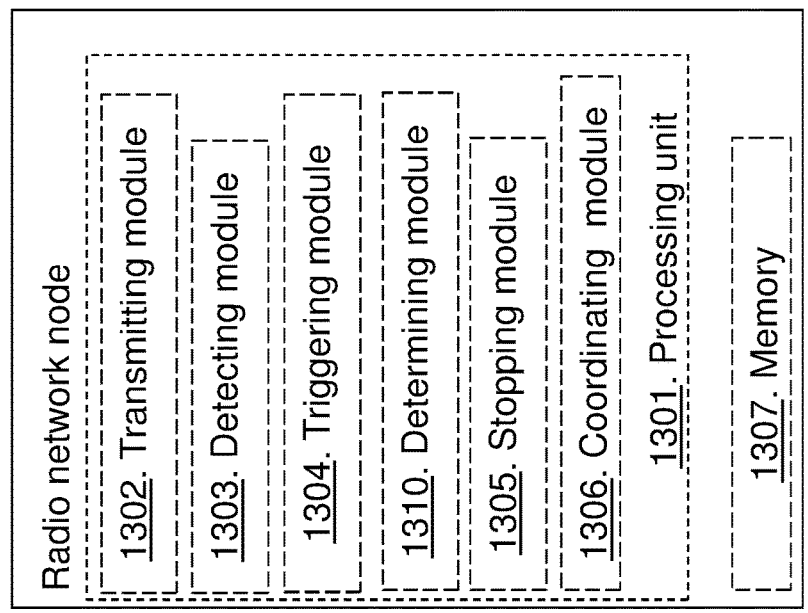
Figure 13:
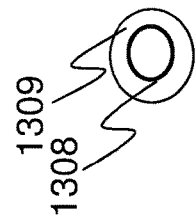

FIG. 13 is a block diagram depicting the radio network node for handling signaling, e.g. transmitting reference signals, in the wireless communication network according to embodiments herein. The radio network node may be the serving or the neighboring node.

The radio network node may comprise a processing unit 1301, e.g. one or more processors, configured to perform the methods herein.

The radio network node may comprise a transmitting module 1302, e.g. a transmitter or a transceiver. The radio network node, the processing unit 1301, and/or the transmitting module 1302 is configured to transmit the synchronization signals with the first periodicity for wireless devices in the service area of the radio network node. E.g. the radio network node, the processing unit 1301, and/or the transmitting module 1302 may be configured to transmit e.g. activate, when the radio network node is not serving one or more wireless device in RRC Connected mode, very sparse synchronization signals (denoted here xSS) to enable inactive and/or idle wireless device to perform wireless device based mobility, initial access acquisition of system information.

The radio network node may comprise a detecting module 1303. The radio network node, the processing unit 1301, and/or the detecting module 1303 is configured to detect one or more wireless devices being in a connected mode and incoming from a handover, or moving to the connected mode within the service area or within a neighborhood of the radio network node. The radio network node, the processing unit 1301, and/or the detecting module 1303 may be configured to detect one or more wireless device moving to connected mode within its own second service area or within its neighborhood, such as the first service area. The radio network node, the processing unit 1301, and/or the detecting module 1303 may be configured to receive the indication from the one or more wireless devices or from another radio network node, which indication indicates that the one or more wireless devices move to the connected mode or being in the connected mode and are incoming from the handover.

The radio network node may comprise a triggering module 1304. The radio network node, the processing unit 1301, and/or the triggering module 1304 is configured to trigger, in response to detecting the one or more wireless devices, the transmission of the additional reference signals for performing measurements on. E.g. the radio network node, the processing unit 1301, and/or the triggering module 1304 may be configured to trigger in response to detecting that the first radio network node 12 needs to serve connected wireless devices, the transmission of additional RSs within the interval between synchronization signals. The radio network node, the processing unit 1301, and/or the triggering module 1304 may be configured to transmit the synchronization signals when the one or more wireless devices are in an inactive or idle mode and then to transmit the additional reference signals when the one or more wireless device move to the connected mode. The additional reference signals may be allocated to different radio resources than the synchronization signals. The radio network node, the processing unit 1301, and/or the triggering module 1304 may be configured to transmit the additional reference signals with a second periodicity being smaller than the first periodicity of the synchronization signals. The radio network node, the processing unit 1301, and/or the triggering module 1304 may be configured to transmit the additional reference signals in between the synchronization signals in time and with the first periodicity. The additional reference signals may be used for radio resource management measurements.

The radio network node may comprise a determining module 1310. The radio network node, the processing unit 1301, and/or the determining module 1310 may be configured to determine whether the additional RSs are still needed.

The radio network node may comprise a stopping module 1305. The radio network node, the processing unit 1301, and/or the stopping module 1305 may be configured to, when additional RSs are not still needed, stop the transmission of the additional reference signals.

The radio network node may comprise a coordinating module 1306. The radio network node, the processing unit 1301, and/or the coordinating module 1306 may be configured coordinate with one or more other radio network nodes to adjust transmissions of the additional reference signals. E.g. coordinate with neighbor radio network nodes (denoted AN-t's) to adjust, e.g. turn on/off, additional RSs.

The second radio network node 13 further comprises a memory 1307. The memory comprises one or more units to be used to store data on, such as signal strengths or qualities, MRSs, additional RSs, SSs, applications to perform the methods disclosed herein when being executed, and similar.

The methods according to the embodiments described herein for the radio network node are respectively implemented by means of e.g. a computer program 1308 or a computer program product, comprising instructions, i.e., software code portions, which, when executed on at least one processor, cause the at least one processor to carry out the actions described herein, as performed by the radio network node. The computer program 1308 may be stored on a computer-readable storage medium 1309, e.g. a USB, a disc or similar. The computer-readable storage medium 1309, having stored thereon the computer program, may comprise the instructions which, when executed on at least one processor, cause the at least one processor to carry out the actions described herein, as performed by the radio network node. In some embodiments, the computer-readable storage medium may be a non-transitory computer-readable storage medium.

Figure 14:
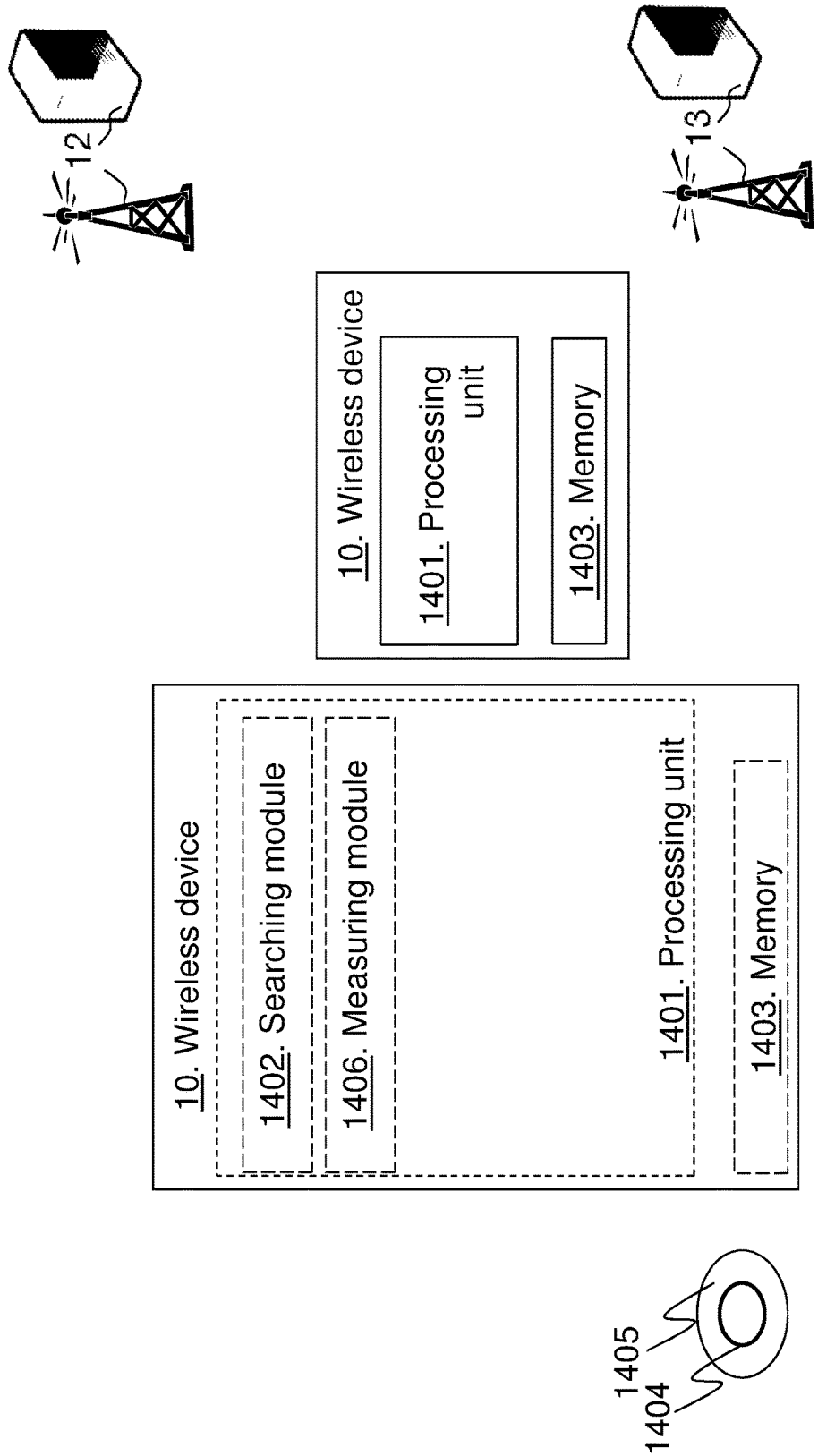
FIG. 14 is a block diagram depicting a wireless device according to embodiments herein.

FIG. 14 is a block diagram depicting the wireless device 10 for handling measurements of signals in the wireless communication network according to embodiments herein.

The wireless device 10 may comprise a processing unit 1401, e.g. one or more processors, configured to perform the methods herein.

The wireless device 10 may comprise a searching module 1402. The wireless device 10, the processing unit 1401, and/or the searching module 1402 is configured to search for synchronization signals transmitted with a first periodicity. The wireless device 10, the processing unit 1401, and/or the searching module 1402 is further configured to search, when being in the connected mode, for additional reference signals for performing measurements on. The wireless device 10, the processing unit 1401, and/or the searching module 1402 may further be configured to search for the synchronization signal when being in an inactive or idle mode and to search for the additional reference signals after transitioning to the connected mode. The additional reference signals may be allocated to different radio resources than the synchronization signals. The wireless device 10, the processing unit 1401, and/or the searching module 1402 may further be configured to search for the additional reference signals with the second periodicity being smaller than the first periodicity of the synchronization signals. The wireless device 10, the processing unit 1401, and/or the searching module 1402 may further be configured to search for the additional reference signals in between the synchronization signals in time and with the first periodicity. E.g. the wireless device 10, the processing unit 1401, and/or the searching module 1402 may be configured search for one or more Synchronization signals over a time interval which time interval is above a threshold. The wireless device 10, the processing unit 1401, and/or the searching module 1402 may be configured to search for additional RS within a certain time window such as the time interval after entering RRC Connected mode or active mode.

The wireless device 10 may comprise a measuring module 1406. The wireless device 10, the processing unit 1401, and/or the measuring module 1406 may be configured to perform radio resource management measurements on the additional reference signals.

The wireless device 10 further comprises a memory 1403. The memory comprises one or more units to be used to store data on, such as signal strengths or qualities, RSs, SSs, applications to perform the methods disclosed herein when being executed, and similar.

The methods according to the embodiments described herein for the wireless device 10 are respectively implemented by means of e.g. a computer program 1404 or a computer program product, comprising instructions, i.e., software code portions, which, when executed on at least one processor, cause the at least one processor to carry out the actions described herein, as performed by the wireless device 10. The computer program 1404 may be stored on a computer-readable storage medium 1405, e.g. a disc or similar. The computer-readable storage medium 1405, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

In some embodiments a more general term "radio-network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), core network node (e.g. Mobile Switching Centre (MSC), Mobility Management Entity (MME) etc), Operation and Maintenance (O&M), Operation Sub System OSS, Self-Organizing Network (SON), positioning node, e.g. Evolved Serving Mobile Location Center (E-SMLC), Minimization of drive tests (MDT), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G or NR. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

ABBREVIATION EXPLANATION

3GPP Third Generation Partnership Project
AN Access Node
DMRS Demodulation Reference Signal
DRS Discovery Reference Signals
eMBB evolved Mobile Broadband
IoT Internet of Things
LAA License Assisted Access
LTE Long Term Evolution
MTC Machine Type Communication
NR New Radio
PCI Physical Cell Identity
PSS Primary Synchronization Signal
RAR Random Access Response
RRC Radio Resource Control
RRM Radio Resource Management
RS Reference Signal
SSS Secondary Synchronization Signal
UE User Equipment

The invention claimed is:
1. A method performed by a radio network node for handling signaling in a wireless communication network, the method comprising:

transmitting synchronization signals with a first periodicity for wireless devices in a service area of the radio network node;
detecting one or more wireless devices being in a connected mode and incoming from a handover, or moving to the connected mode within the service area or within a neighborhood of the radio network node; and
triggering, in response to detecting the one or more wireless devices, a transmission of additional reference signals for performing measurements on;
wherein said detecting comprises monitoring, by the radio network node, both its own Physical Random Access Channel (PRACH) resources and PRACH resources of another radio network node for detecting incoming wireless devices in the service area and incoming wireless devices in a service area of the another radio network node.

2. The method according to claim 1, wherein the additional reference signals are allocated to different radio resources than the synchronization signals.

3. The method according to claim 1, wherein the additional reference signals are transmitted with a second periodicity being smaller than the first periodicity of the synchronization signals.

4. The method according to claim 1, wherein the additional reference signals are transmitted in between the synchronization signals in time and with the first periodicity.

5. The method according to claim 1, further comprising determining whether the additional RSs are still needed; and if not,
stopping the transmission of the additional reference signals.

6. The method according to claim 1, further comprising coordinating with one or more other radio network nodes to adjust transmissions of the additional reference signals.

7. The method according to claim 1, wherein the additional reference signals are used for radio resource management measurements.

8. A radio network node for handling signaling in a wireless communication network, the radio network node comprising a memory and a processing unit comprising one or more processors, the processing unit configured to:
transmit synchronization signals with a first periodicity for wireless devices in a service area of the radio network node;
detect one or more wireless devices being in a connected mode and incoming from a handover, or moving to the connected mode within the service area or within a neighborhood of the radio network node; and to
trigger in response to detecting the one or more wireless devices, a transmission of additional reference signals for performing measurements on;
wherein said detecting comprises the radio network node being configured to monitor both its own Physical Random Access Channel (PRACH) resources and PRACH resources of another radio network node for detecting incoming wireless devices in the service area and incoming wireless devices in a service area of the another radio network node.

9. The radio network node according to claim 8, wherein the additional reference signals are allocated to different radio resources than the synchronization signals.

10. The radio network node according to claim 8, wherein the processing unit is configured to transmit the additional reference signals with a second periodicity being smaller than the first periodicity of the synchronization signals.

11. The radio network node according to claim 8, wherein the processing unit is configured to transmit the additional reference signals in between the synchronization signals in time and with the first periodicity.

12. The radio network node according to claim 8, wherein the processing unit is further configured to
determine whether the additional RSs are still needed; and if not, to
stop the transmission of the additional reference signals.

13. The radio network node according to claim 8, wherein the processing unit is further configured to
coordinate with one or more other radio network nodes to adjust transmissions of the additional reference signals.

14. The radio network node according to claim 8, wherein the additional reference signals are used for radio resource management measurements.

15. A non-transitory computer-readable storage medium comprising a computer program product including instructions to cause at least one processor to:
transmitting synchronization signals with a first periodicity for wireless devices in a service area of a radio network node;
detecting one or more wireless devices being in a connected mode and incoming from a handover, or moving to the connected mode within the service area or within a neighborhood of the radio network node; and
triggering, in response to detecting the one or more wireless devices, a transmission of additional reference signals for performing measurements on;
wherein said detecting comprises monitoring both the radio network node's Physical Random Access Channel (PRACH) resources and PRACH resources of another radio network node for detecting incoming wireless devices in the service area and incoming wireless devices in a service area of the another radio network node.

* * * * *